US012662211B2

(12) United States Patent
Takeuchi

(10) Patent No.: US 12,662,211 B2
(45) Date of Patent: Jun. 23, 2026

(54) STRADDLE-TYPE VEHICLE

(71) Applicant: KAWASAKI MOTORS, LTD., Akashi (JP)

(72) Inventor: Hiroshi Takeuchi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 449 days.

(21) Appl. No.: 18/198,688

(22) Filed: May 17, 2023

(65) Prior Publication Data

US 2023/0373584 A1 Nov. 23, 2023

(30) Foreign Application Priority Data

May 19, 2022 (JP) ................................. 2022-082539

(51) Int. Cl.
*B62J 43/20* (2020.01)
*B62J 43/16* (2020.01)
*E05C 3/04* (2006.01)

(52) U.S. Cl.
CPC .............. *B62J 43/20* (2020.02); *B62J 43/16* (2020.02); *E05C 3/041* (2013.01)

(58) Field of Classification Search
CPC ... B62J 43/16; B62J 43/28; B62J 43/20; B62J 43/23; B62J 45/00; B62J 11/00; B62K 19/40; B60L 50/66; H01M 50/249; H01M 50/244; H01M 50/258; H01M 50/264; B60K 1/04
See application file for complete search history.

(56) References Cited

U.S. PATENT DOCUMENTS

| | | | |
|---|---|---|---|
| 5,613,569 A | 3/1997 | Sugioka et al. | |
| 6,267,543 B1 | 7/2001 | David et al. | |
| 6,624,610 B1 | 9/2003 | Ono et al. | |
| 2002/0003052 A1* | 1/2002 | Hayashi ..................... B62J 1/28 180/68.5 |
| 2015/0122570 A1* | 5/2015 | Miyashiro ................ B60K 1/04 180/220 |
| 2016/0280306 A1* | 9/2016 | Miyashiro ............... B60L 50/64 |
| 2023/0373582 A1* | 11/2023 | Nishiyama .......... H01M 50/249 |

(Continued)

FOREIGN PATENT DOCUMENTS

| | | |
|---|---|---|
| CN | 1342123 A | 3/2002 |
| CN | 2652790 Y | 11/2004 |

(Continued)

*Primary Examiner* — Paul N Dickson
*Assistant Examiner* — Matthew D Lee
(74) *Attorney, Agent, or Firm* — PROCOPIO, CORY, HARGREAVES & SAVITCH LLP

(57) ABSTRACT

There is provided a straddle-type vehicle including: a battery case having an accommodation space that accommodates a battery pack and an opening for attaching and detaching the battery pack via the opening that opens the accommodation space; a pressing mechanism including an abutting member capable of abutting the battery pack in a state where the battery pack is accommodated in the accommodation space of the battery case, and a retainer that holds the abutting member abutting the battery pack while pressing the abutting member toward the battery pack; and a lid body connected to the battery case while bypassing the pressing mechanism and that opens and closes the opening of the battery case.

15 Claims, 14 Drawing Sheets

(56) References Cited

U.S. PATENT DOCUMENTS

| 2023/0373583 A1* | 11/2023 | Takeuchi | B62J 43/16 |
| 2023/0373584 A1* | 11/2023 | Takeuchi | B62J 43/20 |
| 2024/0149967 A1* | 5/2024 | Kaji | B62K 11/04 |
| 2024/0154236 A1* | 5/2024 | Nishimura | H01M 50/204 |
| 2025/0019033 A1* | 1/2025 | Hu | B62M 7/04 |
| 2025/0253472 A1* | 8/2025 | Kenagy | H01M 10/486 |

FOREIGN PATENT DOCUMENTS

| CN | 117104376 A | | 11/2023 | |
| EP | 4530169 A1 * | | 4/2025 | B62J 43/28 |
| WO | 2015-068753 A1 | | 5/2015 | |

* cited by examiner

STRADDLE-TYPE VEHICLE

CROSS-REFERENCE TO RELATED APPLICATIONS

This application is based on and claims priority under 35 USC 119 from Japanese Patent Application No. 2022-082539 filed on May 19, 2022, the contents of which are incorporated herein by reference.

TECHNICAL FIELD

The present disclosure relates to a straddle-type vehicle.

BACKGROUND ART

A straddle-type vehicle including a battery pack is known in which the battery pack can be removed from a vehicle body.

WO2015/068753A1 discloses a straddle-type electric vehicle including a battery case opened upward. The opening of the battery case is covered with a case cover that is rotatable between a closed position and an open position about a shaft of a rear portion of the case cover. The case cover is provided with an upper spring that presses against an upper surface of a battery pack in a state in which the case cover is closed.

Since it is necessary to make the case cover disclosed in the citation document function as a case lid for preventing entry of foreign matters into the battery case and a support body for supporting the spring that presses against the battery pack, a structure of the case cover is likely to be restricted.

SUMMARY OF INVENTION

Accordingly, the present disclosure provides a straddle-type vehicle capable of improving a degree of freedom in design while preventing the movement of the battery pack.

According to an illustrative aspect of the present disclosure, a straddle-type vehicle includes: a battery case having an accommodation space that accommodates a battery pack and an opening for attaching and detaching the battery pack via the opening that opens the accommodation space; a pressing mechanism including an abutting member capable of abutting the battery pack in a state where the battery pack is accommodated in the accommodation space of the battery case, and a retainer that holds the abutting member abutting the battery pack while pressing the abutting member toward the battery pack; and a lid body connected to the battery case while bypassing the pressing mechanism and that opens and closes the opening of the battery case.

According to the present disclosure, it is possible to provide a straddle-type vehicle capable of improving a degree of freedom in design while preventing the movement of the battery pack.

DESCRIPTION OF EMBODIMENTS

Hereinafter, embodiments will be described with reference to the drawings.

First Embodiment

Overall Configuration

Figure 1:
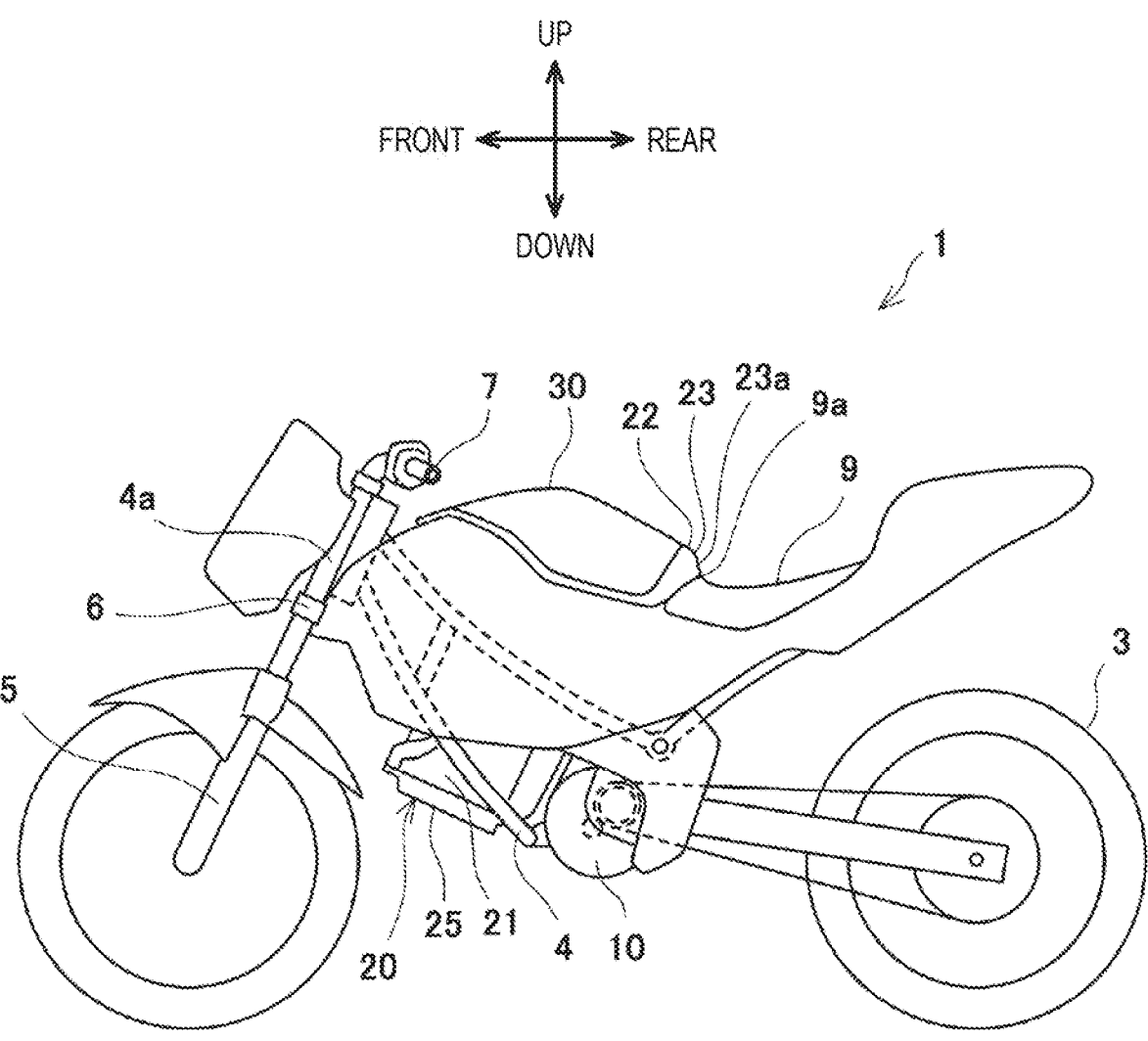
FIG. 1 is a side view of a motorcycle according to a first embodiment.
Figure 2:
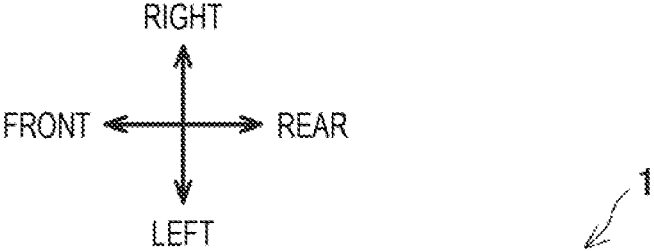
FIG. 2 is a top view of the motorcycle shown in FIG. 1.
Figure 2:
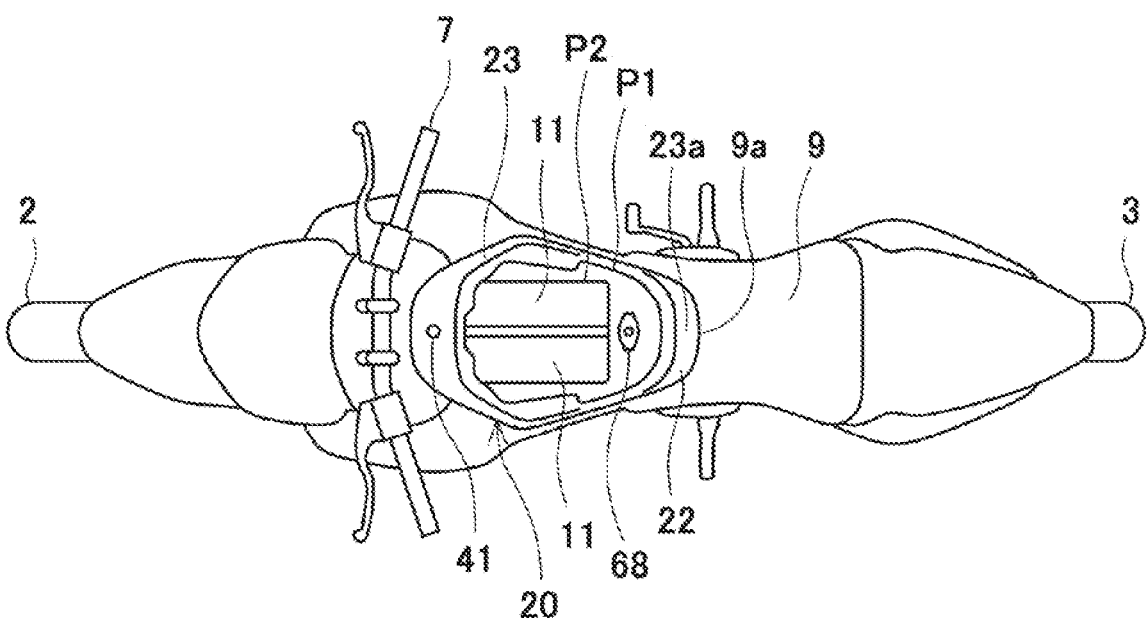

FIG. 1 is a side view of a motorcycle 1 according to a first embodiment. FIG. 2 is a top view of the motorcycle 1 shown in FIG. 1. In FIG. 2, components such as an outer lid 30, a casing 70, and an inner lid 51, which will be described later, are omitted. As shown in FIG. 1, the motorcycle 1 is an example of a straddle-type vehicle on which a rider straddles. In the following description, a front-rear direction corresponds to a vehicle length direction, and a left-right direction corresponds to a vehicle width direction with reference to directions viewed from the rider of the motorcycle 1.

The motorcycle 1 includes a front wheel 2, a rear wheel 3, a vehicle body frame 4, a front suspension 5 that connects the front wheel 2 to a front portion of the vehicle body frame 4, and a rear suspension (not shown) that connects the rear wheel 3 to a rear portion of the vehicle body frame 4. In the present embodiment, the front wheel 2 is a driven wheel, and the rear wheel 3 is a drive wheel. The front suspension 5 is coupled to a bracket 6 disposed at an interval in a vertical direction. A steering shaft connected to the bracket 6 is supported by a head pipe 4a, which is a part of the vehicle body frame 4, so as to be angularly displaceable.

The steering shaft is provided with a handle 7 that is gripped by the rider. A seat 9 on which the rider sits is disposed behind the handle 7. The seat 9 is supported by the vehicle body frame 4.

An electric motor 10 serving as a traveling drive source and a battery case 20 are disposed between the front wheel 2 and the rear wheel 3. The electric motor 10 and the battery case 20 are supported by the vehicle body frame 4. The electric motor 10 generates a rotational driving force transmitted to the rear wheel 3 which is a drive wheel. The electric motor 10 is positioned below the seat 9. In addition, the electric motor 10 is positioned in front of a front end portion (hereinafter, referred to as a "seat front end portion") 9a of a central portion of the seat 9 in the left-right direction.

In the electric motor 10, electric power is supplied from battery packs 11 (see FIG. 2) which are accommodation objects accommodated in the battery case 20 (corresponding to a battery support) forming an accommodation chamber. The outer lid 30 is connected to the battery case 20, and by opening and closing the outer lid 30 of the motorcycle 1, the battery pack 11 can be attached and detached.

The battery pack 11 has a substantially rectangular parallelepiped shape. In the present embodiment, as shown in FIG. 2, the battery case 20 can accommodate the two battery packs 11 such that the two battery packs 11 having the same shape are aligned in the left-right direction.

Battery Case

Figure 3:
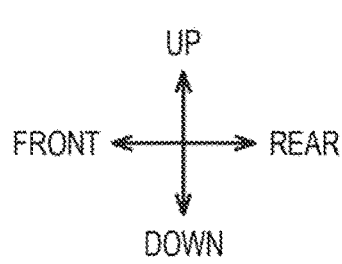
FIG. 3 is an enlarged side cross-sectional view of the vicinity of a battery case when an outer lid shown in FIG. 1 is in a closed state.
Figure 4:
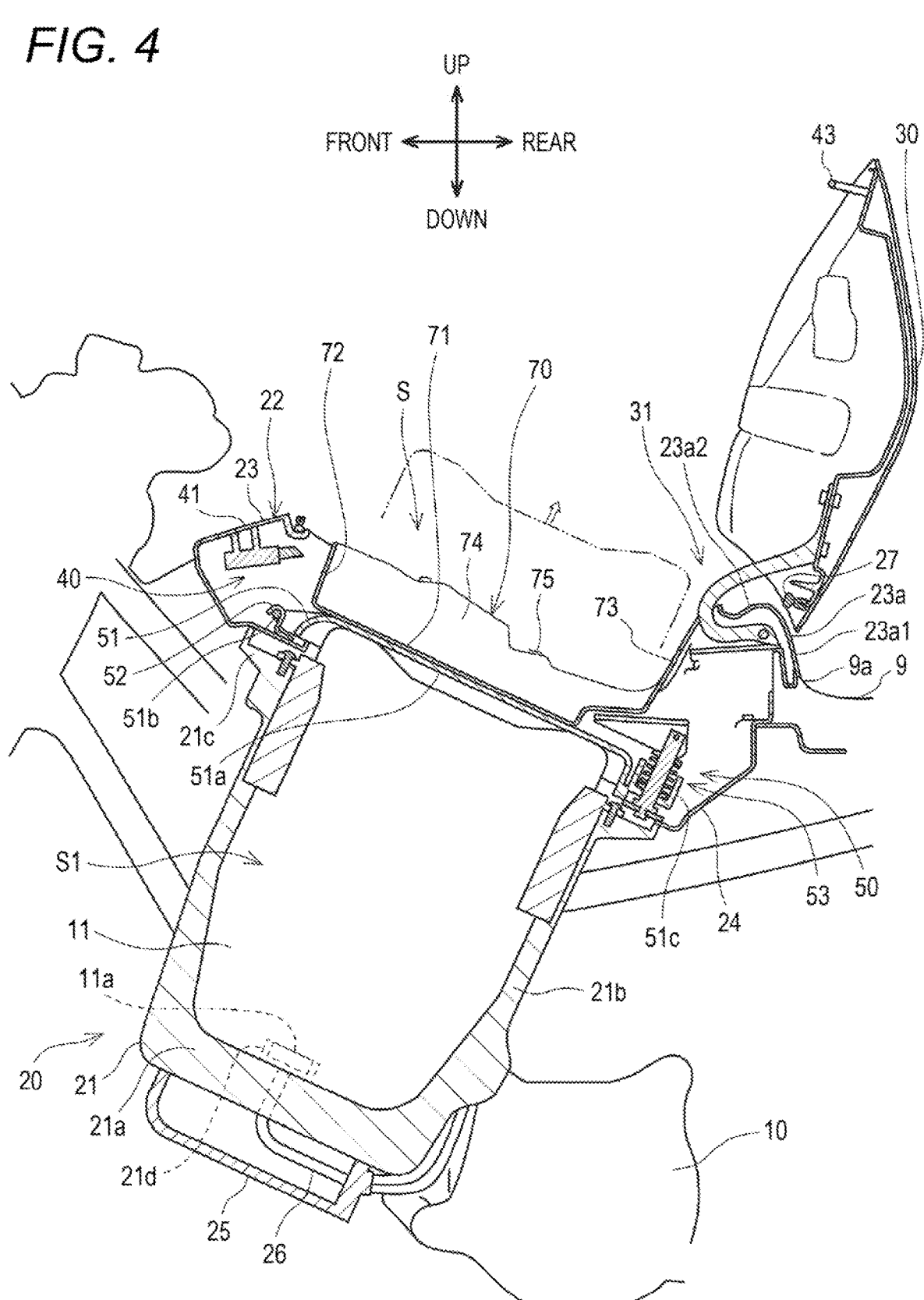
FIG. 4 is an enlarged side cross-sectional view of the vicinity of the battery case when the outer lid shown in FIG. 1 is in an open state.

FIG. 3 is an enlarged side cross-sectional view of the vicinity of the battery case 20 when the outer lid 30 is in a closed state. FIG. 4 is an enlarged side cross-sectional view of the vicinity of the battery case 20 when the outer lid 30 is in an open state. The battery case 20 has an accommodation space S for accommodating the battery pack 11. The battery case 20 has an opening P1 (see FIG. 2) which opens the accommodation space S, and the opening P1 can be opened or closed by the outer lid 30 which is a lid body. The opening P1 is an opening for attaching and detaching the battery pack 11. That is, the opening P1 has a size through which the battery pack 11 can pass. The opening P1 opens upward. That is, the battery pack 11 is accommodated in the battery case 20 or removed from the battery case 20 through the opening P1.

As shown in FIG. 3, the accommodation space S is surrounded by the battery case 20 and the outer lid 30 in front of the seat 9 in the front-rear direction. The battery case 20 includes a case main body 21 opened upward and a base 22 having a frame shape. The base 22 is connected to the case main body 21 so as to surround an upper end portion of the case main body 21. The base 22 includes the opening P1 (hereinafter, also referred to as an "upper opening P1") closed by the outer lid 30 and a lower opening P2 positioned below the upper opening P1. The case main body 21 and the base 22 are connected to each other such that the opening of the case main body 21 and the lower opening P2 of the base 22 are aligned.

The accommodation space S is divided into a plurality of spaces by the inner lid 51 and the casing 70 disposed in the accommodation space S. For example, the inner lid 51 is disposed so as to close the opening of the case main body 21, that is, the lower opening P2 of the base 22. The inner lid 51 partitions the accommodation space S into a first space S1 surrounded by the case main body 21 and the inner lid 51 and a remaining space. The first space S1 is a space occupied by the battery pack 11 accommodated therein.

The casing 70 is mounted on an upper surface of the inner lid 51. The casing 70 has a concave shape opened upward. The casing 70 includes a bottom wall 71 that is parallel to the inner lid 51, a first partition wall 72 that rises upward from an edge portion on a front side of the bottom wall 71, and a second partition wall 73 that rises upward from an edge portion on a rear side of the bottom wall 71. A space surrounded by the inner lid 51, the base 22, and the outer lid 30 in the closed state (that is, the remaining space described above) is divided into three spaces of a second space S2, a third space S3, and a fourth space S4 by the first partition wall 72 and the second partition wall 73.

The second space S2, the third space S3, and the fourth space S4 are aligned in the front-rear direction. The second space S2 is a space sandwiched between the first partition wall 72 and the second partition wall 73 in the front-rear direction. The second space S2 is an inner space of the casing 70 and functions as a luggage accommodation space for accommodating luggage as an accommodation object. The third space S3 is a space in front of the second space S2, and the fourth space S4 is a space behind the second space S2. A lock mechanism 40, an engaging member 52, and the like, which will be described later, are disposed in the third space S3, and a hinge shaft 32, a retainer 53, and the like, which will be described later, are disposed in the fourth space S4. The third space S3 and the fourth space S4 may also be referred to as a mechanism element accommodation space in which various elements of various mechanisms are accommodated. In particular, the fourth space S4 accommodating the hinge shaft 32 may also be referred to as a shaft accommodation space.

The casing 70 includes a pair of side walls 74. One of the pair of side walls 74 connects right end portions of the first partition wall 72 and the second partition wall 73, and the other connects left end portions of the first partition wall 72 and the second partition wall 73. A flange 75 extending outward in the vehicle width direction is connected to an upper end portion of each of the side walls 74. The flange 75 abuts a part of a back surface of the outer lid 30 in the closed state and is pressed from above. This structure prevents the casing 70 from moving up and down in the accommodation space S.

The case main body 21 has a box shape opened upward. The case main body 21 includes a rectangular bottom wall 21a that supports a back surface of the battery pack 11, and a peripheral wall 21b that rises upward from the entire periphery of the bottom wall 21a. The battery case 20 is inclined rearward with respect to a vertically upward direction. More specifically, the bottom wall 21a is inclined upward toward the front, and a rear side portion of the peripheral wall 21b is inclined upward toward the rear. A rear end portion of the upper opening P1 of the base 22 is positioned behind a rear end portion of an opening edge of the case main body 21. In this way, the case main body 21 is disposed such that the battery pack 11 can be obliquely inserted or removed.

The case main body 21 has the first space S1 (hereinafter, also referred to as a "battery space"). The case main body 21 includes a flange 21c around an opening positioned at an upper end of the peripheral wall 21b. The flange 21c is fixed to the base 22 by a fastening means such as a bolt.

A support-side connector 21d is disposed on an upper surface of the bottom wall 21a. A battery-side connector 11a is disposed on the back surface of the battery pack 11. The support-side connector 21d and the battery-side connector 11a are configured such that when the battery pack 11 is guided downward toward the bottom wall 21a by the peripheral wall 21b, terminals of the support-side connector 21d and the battery-side connector 11a are brought into contact with each other to enable electrical connection.

In this way, the electrical connection between the support-side connector 21d and the battery-side connector 11a can be implemented by a simple method of guiding the battery pack 11 downward by the peripheral wall 21b. In other words, the contact between the terminals of the support-side connector 21d and the battery-side connector 11a can be released simply by moving the battery pack 11 upward in the battery case 20. However, since a pressing mechanism 50, which will be described later, prevents a vertical movement of the battery pack 11, the power supply from the battery pack 11 to the electric motor 10 is prevented from being cut off.

A harness cover 25 is attached to the bottom wall 21a of the case main body 21 from below. The harness cover 25 is concave, and is attached to the case main body 21 by a fastening means such as a bolt, thereby forming a harness space partially covering a harness 26 extending through the bottom wall 21a from the support-side connector 21d. Components other than the harness, such as a step-down circuit board that reduces a voltage of the power output from the battery pack 11, may be disposed in the harness space. The harness cover 25 is separate from the case main body 21, but the harness cover 25 and the case main body 21 may be integrally molded.

The frame-shaped base 22 includes an upper base frame 23 constituting an upper portion of the base 22 and a lower base frame 24 constituting a lower portion of the base 22. A lower end portion of the upper base frame 23 and an upper end portion of the lower base frame 24 are connected to each other. As shown in FIG. 2, the upper base frame 23 includes the upper opening P1 closed by the outer lid 30, and the lower base frame 24 includes the lower opening P2 positioned below the upper opening P1. The lower opening P2 is closed by the inner lid 51. A thickness direction dimension of the outer lid 30 (corresponding to the lid body) is smaller than a thickness direction dimension of the inner lid 51 (corresponding to an abutting member). That is, the outer lid 30 is thinner than the inner lid 51. Accordingly, the inner lid 51 can easily receive a pressing reaction force, and a weight of the outer lid 30 can be reduced.

The upper base frame 23 has an annular shape with a substantially elliptical outer shape in a top view of the motorcycle 1 (see FIG. 2 as well). The upper base frame 23 and the outer lid 30 thereof closing the upper opening P1 form a dome shape opening downward. The lower base frame 24 has an annular shape with a substantially elliptical outer shape in a top view of the motorcycle 1. The lower base frame 24 and the inner lid 51 thereof closing the lower opening P2 form a concave shape opening upward.

The base 22 includes a protruding portion 23a protruding obliquely forward and upward from the seat front end portion 9a. The protruding portion 23a is a portion positioned near the center of the upper base frame 23 in the left-right direction and behind the upper opening P1. The protruding portion 23a has a shape in which a central portion thereof in the vehicle width direction bulges rearward. The protruding portion 23a functions as a restriction portion that restricts a front end position of a seating range of the rider. The protruding portion 23a plays a role of supporting the rider so as not to deviate from the seating range of the seat 9 when the rider receives an inertial force forward while the motorcycle 1 is decelerating.

Opening and Closing Mechanism

Figure 5:
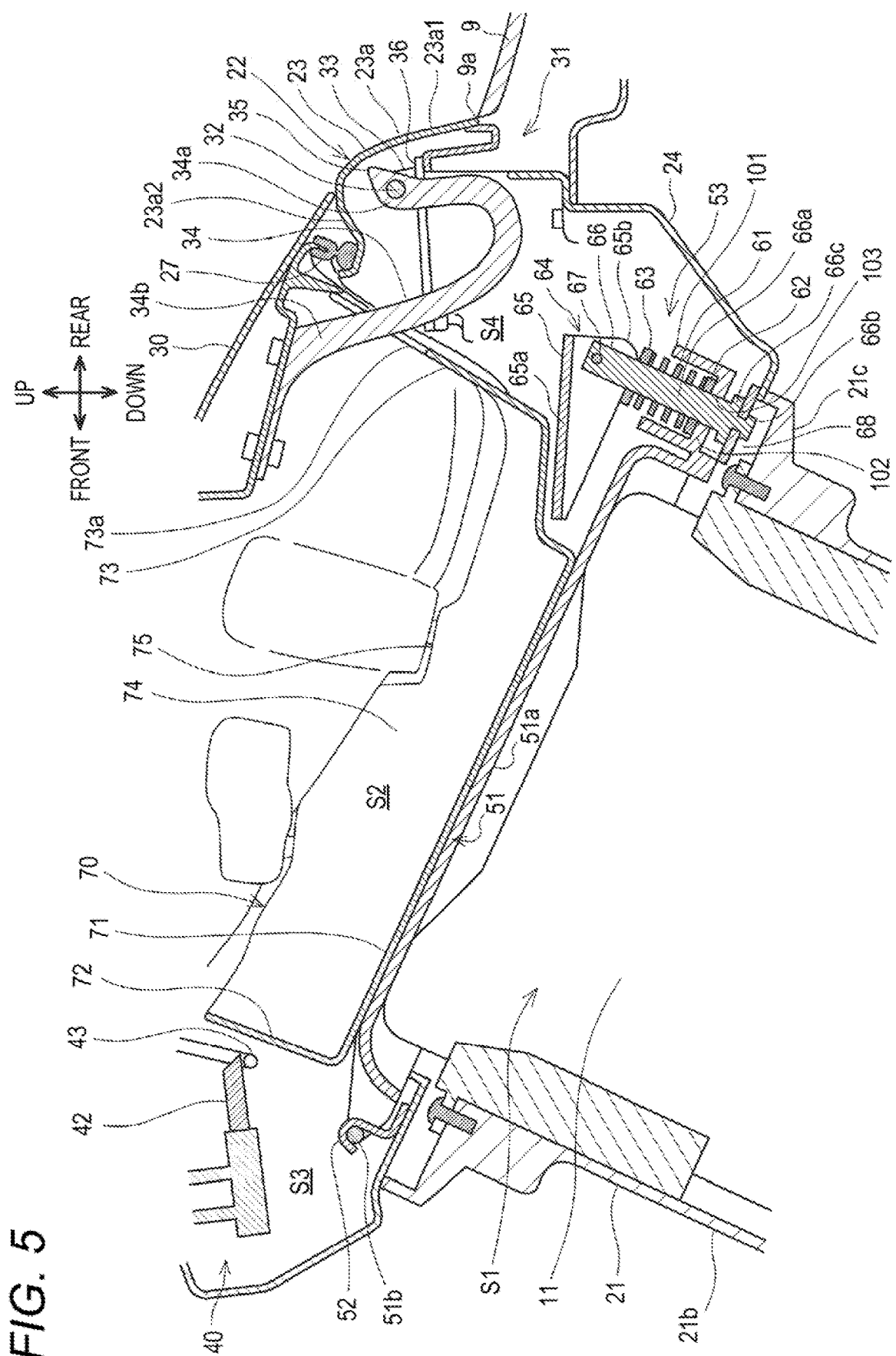
FIG. 5 is an enlarged side cross-sectional view of the vicinity of an upper portion of the battery case shown in FIG. 1.

FIG. 5 is an enlarged side cross-sectional view of the vicinity of an upper portion of the battery case 20. The motorcycle 1 includes an opening and closing mechanism 31 that opens and closes the outer lid 30. The opening and closing mechanism 31 pivots the outer lid about the hinge shaft 32 between an open position where the accommodation space S is opened upward and a closed position where the accommodation space S is covered from above. As shown in FIG. 5, the opening and closing mechanism 31 includes the hinge shaft 32, a hinge support 33, and an arm 34.

The hinge shaft 32 is a shaft serving as a center of pivot of the outer lid 30. The hinge shaft 32 extends in the left-right direction. The hinge shaft 32 is disposed above and in front of the seat front end portion 9a. The hinge shaft 32 is positioned at the center in the left-right direction of a center plane of the motorcycle 1 in the left-right direction so as to pass through the center plane. The hinge shaft 32 is disposed at a position spaced apart from at least one of a lower side or a rear side from a central portion in the left-right direction of the outer lid 30 at the closed position, that is, in the closed state. In the present embodiment, as shown in FIG. 3, a rear end portion 30a of the central portion in the left-right direction of the outer lid 30 in the closed state is a lower end in the central portion in the left-right direction of the outer lid 30, and the hinge shaft 32 is disposed at a position spaced downward from the rear end portion 30a. The hinge shaft 32 is disposed at the same position as the rear end portion 30a in the front-rear direction.

The hinge support 33 is fixed to the base 22. The hinge support 33 connects the base 22 and the hinge shaft 32 to each other and supports the hinge shaft 32. The hinge shaft 32 and the hinge support 33 are positioned above the vehicle body frame 4 and below the central portion in the left-right direction of the outer lid 30 in the closed state. That is, the hinge shaft 32 and the hinge support 33 can be disposed closer to the vehicle body frame 4 than the outer lid 30, and hinge support rigidity can be easily enhanced.

The arm 34 connects the outer lid 30 and the hinge shaft 32, and pivots about the hinge shaft 32 together with the outer lid 30. The arm 34 is positioned on the center plane of the motorcycle 1 in the left-right direction, that is, at the center in the vehicle width direction. As described above, the protruding portion 23a has a shape in which the central portion thereof in the vehicle width direction bulges rearward. Therefore, when the arm 34 is positioned at the center in the vehicle width direction, the hinge shaft 32 can be disposed closer to the vehicle body frame 4, and the hinge support rigidity can be easily enhanced.

A base end portion 34a, which is a rear end portion of the arm 34 when the outer lid is at the closed position, is connected to the hinge shaft 32, and a distal end portion 34b, which is a front end portion of the arm 34 when the outer lid 30 is at the closed position, is connected to the back surface of the outer lid 30 in the closed state. The outer lid 30 bypasses the pressing mechanism 50 to be described later and is connected to the battery case 20. Since the outer lid 30 is angularly displaced about the hinge shaft 32 serving as the rear end portion of the arm 34, the outer lid 30 can be disposed at a position spaced upward from the base 22 in the open state. The arm 34 has a shape that does not interfere with the base 22 when the outer lid 30 is moved between the open position and the closed position. When viewed in the left-right direction, the arm 34 has a bent shape in which the front end portion of the arm 34 when the outer lid 30 is at the open position is positioned in front of a front end portion of the protruding portion 23a of the base 22 (see FIG. 4).

The shape of the base 22 and the shape of the arm 34 that does not interfere with the base 22 will be described in more detail. The protruding portion 23a of the base 22 includes a portion (hereinafter, also referred to as an "exposed portion") 23a1 exposed as viewed from the rear or above when the outer lid 30 is at the closed position, and a portion (hereinafter, also referred to as a "non-exposed portion") 23a2 that extends forward from a front end of the exposed portion 23a1 and is covered by the outer lid 30 at the closed position from above. The exposed portion 23a1 is a portion that closes a gap between the seat front end portion 9a and the rear end portion 30a of the outer lid 30 at the closed position and functions as a restriction portion that restricts the front end position of the seating range of the rider. The exposed portion 23a1 (specifically, a surface of the exposed portion 23a1 facing the front) and the hinge shaft 32 face each other in the front-rear direction. That is, the exposed portion 23a1 overlaps the hinge shaft 32 in the front-rear direction so as to cover the entire hinge shaft 32 when viewed from the rear.

As shown in FIG. 5, a seal 27 is attached to the outer lid 30. The seal 27 has a ring shape extending along a peripheral edge portion of the outer lid 30. A rear end portion of the seal 27 is in close contact with the base 22 when the outer lid 30 is at the closed position, thereby preventing a fluid from passing between the outer lid 30 and the base 22. When the outer lid 30 is at the closed position, the seal 27 is brought into close contact with an upper surface of the non-exposed portion 23a2. Therefore, the non-exposed portion 23a2 may also be referred to as a seal support portion. A portion of the non-exposed portion 23a2 where the seal 27 is brought into close contact is formed in a concave shape. Specifically, a portion of the non-exposed portion 23a2 where the seal 27 is brought into close contact when the outer lid 30 is at the closed position protrudes downward as compared with a portion of the non-exposed portion 23a2 adjacent to the rear of that portion.

In the present embodiment, when the outer lid 30 is at the closed position, the arm 34 is formed in a U shape protruding downward. Specifically, the arm 34 extends downward as it advances forward from the base end portion 34a and reaches a lower end portion positioned at an intermediate position in the front-rear direction. The arm 34 extends upward as it advances further forward from the lower end portion and reaches the distal end portion 34b which is a front end portion. By forming the arm 34 in a U shape in this way, it is possible to prevent interference between the protruding portion 23a (more specifically, the non-exposed portion 23a2) and the arm 34 and to widen a pivot range of the outer lid 30.

In the closed state of the outer lid 30, the distal end portion 34b (a portion connected to the outer lid 30) of the arm 34 is disposed above the base end portion 34a (a portion connected to the hinge shaft 32) of the arm 34. Since the hinge shaft 32 is disposed below a lower end portion of the outer lid 30, when the outer lid 30 is fully opened, the outer lid 30 can be moved away from the upper opening P1, and when the battery pack 11 is accommodated or removed, interference between the outer lid 30 and the battery pack 11 is less likely to occur.

A notch 73a for inserting the arm 34 is formed in second partition wall 73 of the casing 70 so that the casing 70 does not interfere with the arm 34.

The opening and closing mechanism 31 has a stopper structure that restricts the pivot range of the outer lid 30. Specifically, the base end portion 34a of the arm 34 has a protrusion 35 protruding in a radial direction about the hinge shaft 32. The protrusion 35 abuts a receiving portion 36 fixed to the base 22 when the arm 34 pivots with the pivot of the outer lid 30 and the outer lid 30 rotates from the closed position by a predetermined angle to the open position. The protrusion 35 and the receiving portion (stopper) 36 constitute the stopper structure. Thus, the pivot range of the outer lid 30 is restricted. A position of the protrusion 35 is adjusted such that, when the outer lid 30 is moved to the open position, the pivot range of the outer lid 30 is restricted to a range in which the arm 34 does not come into contact with the base 22 and the rear end portion of the outer lid 30 does not come into contact with the protruding portion 23a. By disposing the stopper structure that restricts the pivot range of the outer lid 30 around the hinge shaft 32, the fourth space S4 which is a space covered by the protruding portion 23a can be effectively used.

The motorcycle 1 also includes the lock mechanism 40. The lock mechanism 40 is a mechanism that holds the outer lid 30 at the closed position. The lock mechanism 40 includes an insertion port 41, a lock movement portion 42, and a lock fixing portion 43. The insertion port 41 is provided at a front-side portion of the base 22, more specifically, at a front-side portion of the upper base frame 23. The lock movement portion 42 is movable between a locked position and an unlocked position when a key of the rider is inserted into the insertion port 41 and operated. The lock fixing portion 43 is locked to the lock movement portion 42 at the locked position such that the outer lid 30 does not move from the closed position to the open position. The lock movement portion 42 is attached to the upper base frame 23, and the lock fixing portion 43 is fixed to the outer lid 30. Thus, the lock mechanism 40 can switch between a locked state in which the outer lid 30 is held at the closed position and an unlocked state in which the outer lid 30 is held at the closed position.

In the present embodiment, the base 22, the outer lid 30, the opening and closing mechanism 31, and the lock mechanism 40 are unitized as a cover unit. By fixing the cover unit to the case main body 21, that is, by fastening the base 22 to the flange 21c of the case main body 21, a battery accommodation unit is unitized. Since the elements related to the attachment and detachment of the battery pack 11 are unitized in this way, it is easy to design and assemble the motorcycle 1 so as to facilitate the attachment and detachment of the battery pack 11. For example, a design in which the upper opening P1 is positioned in a direction in which the battery pack 11 is pulled out from the case main body 21 such as a design that does not require changing the direction in which the battery pack 11 is pulled out halfway in order to avoid an element of the cover unit such as the arm 34 is facilitated (see a two-dot chain line in FIG. 4). For example, it is easy to adjust positions of the lower opening P2 and the upper opening P1 of the base 22 with respect to the opening edge of the case main body 21.

Pressing Mechanism

The motorcycle 1 includes the pressing mechanism 50. The pressing mechanism 50 is disposed in the accommodation space S. The pressing mechanism 50 includes the inner lid 51, the engaging member 52, and the retainer 53.

The inner lid 51 is an abutting member that can abut the battery pack 11 accommodated in the accommodation space S of the battery case 20. In the present embodiment, when the battery pack 11 is accommodated in the battery case 20, an upper portion of the battery pack 11 protrudes slightly upward from the opening of the case main body 21. Therefore, the inner lid 51 has a concave shape that opens downward so as to cover the portion of the battery pack 11 protruding from the case main body 21 and close the battery space S1. The concave surface of the inner lid 51 facing downward abuts an upper surface of the accommodated battery pack 11. Hereinafter, a position of the inner lid 51 when the inner lid 51 abuts the battery pack 11 is referred to as an abutment position or the closed position.

In the present embodiment, the battery case 20 supports the two battery packs 11 aligned in the left-right direction from below such that heights of upper surfaces of the battery packs 11 coincide with each other, and the upper surfaces of the two battery packs 11 abut against the one inner lid 51.

Figure 6:
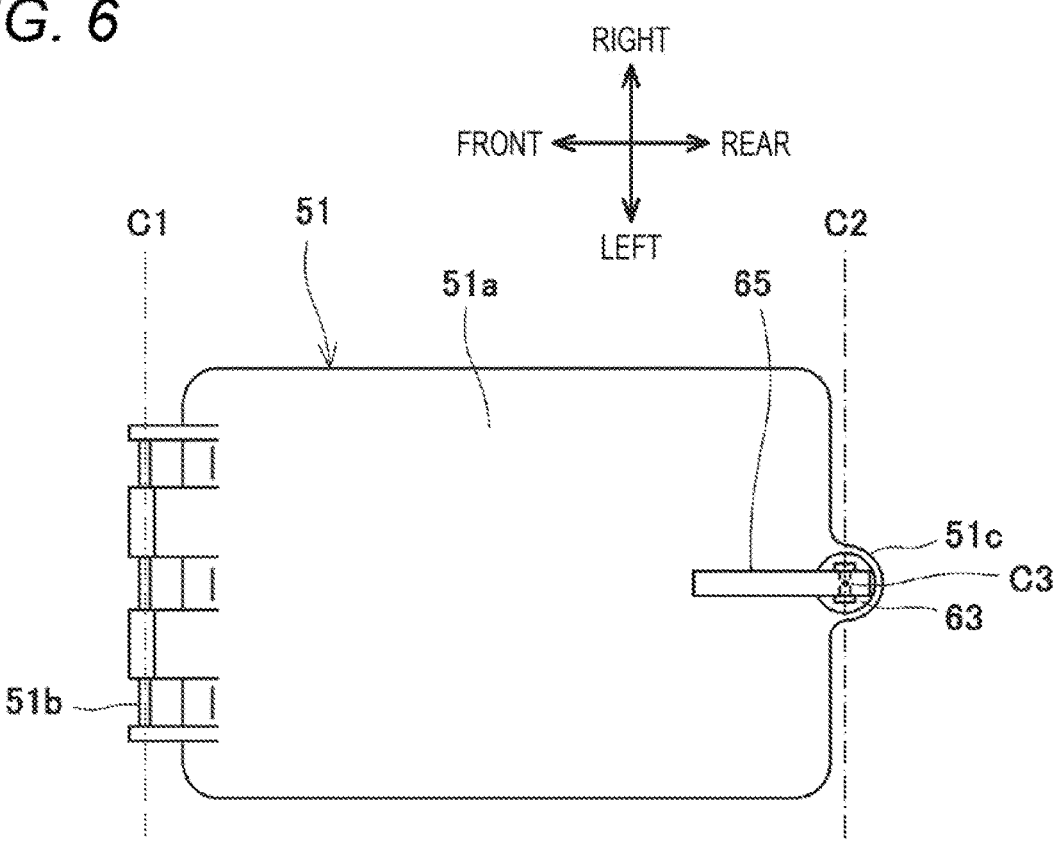
FIG. 6 is a top view of an inner lid shown in FIG. 1.

The inner lid 51 is detachable from the battery case 20. FIG. 6 is a top view of the inner lid 51. The inner lid 51 includes a lid main body 51*a*, an engaged portion 51*b*, and a support portion 51*c*. When the inner lid 151 is at the abutment position, the lid main body 151*a* closes the lower opening P2. The engaged portion 51*b* is fixed to a front end portion of the lid main body 51*a*. The engaged portion 51*b* can be engaged with the engaging member 52 fixed to the battery case 20. The engaged portion 51*b* has a rod shape extending in the left-right direction. Hereinafter, the engaged portion 51*b* may also be referred to as an engaged shaft 51*b*.

The engaging member 52 has an engaging structure that can be attached to and detached from the inner lid 51. The inner lid 51 can pivot about an axis C1 of the engaged shaft 51*b* in a state in which the engaged shaft 51*b* is engaged with the engaging member 52. Specifically, the engaging member 52 is disposed in front of the lower opening P2 in the base 22 (more specifically, the lower base frame 24). The engaging member 52 is disposed in the third space S3. The engaging member 52 is fixed to the base 22 and has a hook shape. Hereinafter, the engaging member 52 may also be referred to as an engaging hook 52. When the engaged shaft 51*b* of the inner lid 51 is hooked to the engaging hook 52, the inner lid 51 can pivot about the axis C1 of the engaged shaft 51*b*. When the inner lid 51 pivots, the inner lid 51 abuts the battery pack 11 and closes the battery space S1, or moves away from the battery pack 11 to open the battery space S1.

The support portion 51*c* is fixed to a rear end portion of the lid main body 51*a*. The support portion 51*c* supports a later-described compression spring 61 and the like, which are components of the retainer 53.

As shown in FIG. 5, when the inner lid 51 is at the abutment position, the retainer 53 is disposed behind the lower opening P2 in the base 22 (more specifically, the lower base frame 24). In other words, the retainer 53 is disposed on a side where the upper surface of the battery pack 11 is inclined downward. The retainer 53 is disposed on the same side as the hinge shaft 32 with respect to the battery pack 11. That is, in a state in which the casing 70 is disposed in the accommodation space S, the retainer 53 is accommodated in the fourth space S4 similar to the hinge shaft 32 of the opening and closing mechanism 31. Therefore, the hinge shaft 32 and the retainer 53 of the pressing mechanism 50 are positioned at positions hidden by the second partition wall 73, that is, at positions that are difficult to be visually recognized by a user only by opening the outer lid 30.

The retainer 53 holds the inner lid 51 abutting against the battery pack 11 while pressing the inner lid 51 toward battery pack 11. That is, the retainer 53 has a pressing function of pressing the inner lid 51 downward when the inner lid 51 is at the abutment position. The retainer 53 also has a locking function of locking the inner lid 51 to the battery case 20 when the inner lid 51 is at the abutment position.

The retainer 53 includes the compression spring 61, a first spring seat 62, a second spring seat 63, an operating member 64, and a locked portion 68. Of the components of the retainer 53, the compression spring 61, the first spring seat 62, the second spring seat 63, and the operating member 64 are supported by the support portion 51*c* of the inner lid 51, and can move integrally with the inner lid 51. The compression spring 61 is a coil spring. The first spring seat 62 and the second spring seat 63 are annular. The operating member 64 is a member operated by a user.

Of the components of the retainer, the locked portion 68 of the retainer 53 is provided in the battery case 20. Specifically, the locked portion 68 is disposed on the lower base frame 24 on a rear side of the lower opening P2 of the lower base frame 24. The locked portion 68 is positioned at a position overlapping the upper opening P1 in a top view of the motorcycle 1 (see FIG. 2). That is, the retainer 53 including the locked portion 68 is positioned at a position overlapping the upper opening P1 in a top view of the motorcycle 1. Therefore, the retainer 53 is positioned at a position where the user can easily access the retainer 53.

The locked portion 68 is locked by a later-described locking portion 66*b* of the operating member 64. In the present embodiment, the locked portion 68 is a hole extending in a predetermined direction. For example, the locked portion 68 has an elongated hole shape or a keyhole shape. Hereinafter, the locked portion 68 may also be referred to as a locked hole 68. In the present embodiment, the locked hole 68 extends in the left-right direction, but may extend in the front-rear direction, for example.

As shown in FIG. 5, the first spring seat 62 supports a first end portion 61*a* of the compression spring 61, and the second spring seat 63 supports a second end portion 61*b* of the compression spring 61. As shown in FIG. 5, when the inner lid 51 is at the abutment position, the first end portion 61*a* is a lower end portion of the compression spring 61, and the second end portion 61*b* is an upper end portion of the compression spring 61. That is, when the inner lid 51 is at the abutment position, the first spring seat 62 is positioned on a lower side of the compression spring 61, and the second spring seat 63 is positioned on an upper side of the compression spring 61.

The first spring seat 62 is fixed to the inner lid 51. Specifically, the support portion 51*c* of the inner lid 51 includes a bottomed cylindrical portion 101 opened upward, and the first spring seat 62 is disposed on a bottom 102 of the cylindrical portion 101. The compression spring 61 is accommodated in the cylindrical portion 101 of the support portion 51*c* such that the first spring seat 62 supports the first end portion 61*a* of the compression spring 61. That is, the inner lid 51 includes an accommodating portion (in the present embodiment, the cylindrical portion 101) accommodating the compression spring 61. The first spring seat 62 may be configured by a part of the inner lid 51. The bottom 102 of the cylindrical portion 101 of the support portion 51*c* in which the first spring seat 62 is disposed is formed with a through hole 103 through which a cam support 66, which will be described later, is inserted.

The second spring seat 63 is connected to the inner lid 51 so as to be movable relative to the inner lid 51. In the present embodiment, the second spring seat 63 is connected to the inner lid 51 via the operating member 64.

The operating member 64 includes a cam lever 65 and the cam support 66. The cam lever 65 is disposed on a side opposite to the compression spring 61 with respect to the second spring seat 63. The second spring seat 63 is sandwiched between the cam lever 65 and the compression spring 61. The cam lever 65 is supported by the cam support 66 via a support shaft 67 extending in the left-right direction so as to be pivotable about an axis C2 of the support shaft 67.

The cam lever 65 includes a lever portion 65a which is a portion a user touches with hands, and a pressing portion 65b which is displaced when the lever portion 65a is operated. The cam lever 65 has a shape extending in a radial direction from the support shaft 67 so as to be easily operated by the user, and the extending portion is the lever portion 65a. The lever portion 65a corresponds to an operator. The pressing portion 65b is a curved surface portion whose distance from the support shaft 67 changes corresponding to a pivot angle of the cam lever 65 when viewed in a direction of the axis C2 of the support shaft 67.

The pressing portion 65b presses the second spring seat 63 toward the compression spring 61. By pivoting the cam lever 65 about the axis C2, the pressing portion 65b can be displaced between a pressing position where the pressing portion 65b presses the inner lid 51 against the battery pack 11 and a pressing-released position where a pressing force at the pressing position is released. A state of the retainer 53 in which the pressing portion 65b is at the pressing position is referred to as a pressing state, and a state of the retainer 53 in which the pressing portion 65b is at the pressing-released position is referred to as a pressing-released state. In the present embodiment, the pressing portion 65b at the pressing-released position does not generate a pressing force for pressing the inner lid 51 against the battery pack 11. However, the pressing portion 65b at the pressing-released position may generate a pressing force smaller than the pressing force generated when the pressing portion 65b is at the pressing position.

The cam support 66 is connected to the inner lid 51 and supports the cam lever 65 via the support shaft 67. The cam support 66 includes a rod-shaped portion 66a extending along an axis C3 of the cylindrical portion 101. The support shaft 67 is supported at one end portion of the rod-shaped portion 66a. The rod-shaped portion 66a is inserted radially inside the second spring seat 63, the compression spring 61, and the first spring seat 62. The rod-shaped portion 66a is also inserted into the through hole 103 of the bottom 102 of the cylindrical portion 101 of the support portion 51c.

The cam support 66 includes the locking portion 66b which is a protrusion protruding from the other end portion of the rod-shaped portion 66a in a direction perpendicular to the axis C3. The locking portion 66b is positioned at a position protruding from the through hole 103 of the rod-shaped portion 66a to a side opposite to the compression spring 61. That is, the locking portion 66b is positioned below the bottom 102 of the cylindrical portion 101.

When the locking portion 66b rotates about the axis C3 and is at a predetermined unlocking position, the locking portion 66b can be inserted into the locked hole 68. In the present embodiment, the unlocking position is a position where an extending direction of the locked hole 68 coincides with a protruding direction of the locking portion 66b. In the present embodiment, since the locked hole 68 extends in the left-right direction, when the protruding direction of the locking portion 66b coincides with the left-right direction, the locking portion 66b can be inserted into the locked hole 68. When the locking portion 66b rotates about the axis C3 and is at a locking position other than the unlocking position, the locking portion 66b cannot be inserted into the locked hole 68. That is, after the locking portion 66b is inserted into the locked hole 68 by operating the operating member 64, the locking portion 66b is rotated about the axis C3 such that the locking portion 66b cannot be inserted into the locked hole 68, whereby the inner lid 51 is locked so as not to be separated from the locked hole 68.

A guide portion 66c is provided in a portion of the rod-shaped portion 66a protruding downward from the through hole 103. The guide portion 66c has a flange shape, and when locking or unlocking is performed by the locking portion 66b, the guide portion 66c abuts the periphery of the locked hole 68 to guide the rotation of the operating member 64 about the axis C3. For example, a dimension between the guide portion 66c and the locking portion 66b substantially matches a dimension of the locked hole 68 in a penetrating direction.

The guide portion 66c has a size or a shape that cannot be inserted into the through hole 103 or the locked hole 68. Therefore, when an operation of lifting the operating member 64 upward is performed, the inner lid 51 is also lifted supported by the guide portion 66c. The operating member 64 is connected to the inner lid 51 so as to be displaceable. For example, the operating member 64 is connected to the support portion 51c of the inner lid 51 so as to be rotatable about the axis C3 of the cam support 66. The operating member 64 is connected to the support portion 51c of the inner lid 51 so as to be displaceable with respect to the inner lid 51 in the direction of the axis C3 of the cam support 66.

In the pressing mechanism 50, by operating the cam lever 65, both locking the inner lid 51 to the battery case 20 and pressing the inner lid 51 downward can be performed. In a state in which the inner lid 51 is at the abutment position, more specifically, in a state in which the locking portion 66b is inserted into the locked hole 68, the cam lever 65 is operated to rotate the locking portion 66b about the axis C3. When the locking portion 66b is displaced from the unlocking position to the locking position, the locking portion 66b cannot be inserted into the locked hole 68, and the locked hole 68 is locked by the locking portion 66b. As a result, the position of the support shaft 67 is fixed.

Thereafter, by pivoting the cam lever 65 about the axis C2 of the support shaft 67, the pressing portion 65b is displaced from the pressing-released position to the pressing position with respect to the axis C2. As a result, the second spring seat 63 approaches the first spring seat 62. As a result, the compression spring 61 is compressed, and a biasing force of the compression spring 61 is generated or increased in the inner lid 51 in a direction away from the support shaft 67 of the cam support 66, that is, downward. As described above, the retainer 53 is configured to hold the second spring seat 63 in a state in which the second spring seat 63 is displaced with respect to the first spring seat 62 such that the inner lid 51 is biased toward the battery pack 11 by the compression spring 61.

In the present embodiment, the inner lid 51 or the battery pack 11 does not completely close the lower opening P2 when not pressed by the pressing mechanism 50. That is, when the inner lid 51 is not pressed by the pressing mechanism 50, a slight gap is formed between the base 22 and a part of a peripheral edge of the lid main body 51a. This gap disappears when the inner lid 51 is pressed by the pressing mechanism 50. The inner lid 51 may not abut against the battery pack 11 when the inner lid 51 is not pressed by the pressing mechanism 50, and may abut against the battery pack 11 when the inner lid 51 is pressed by the pressing mechanism 50.

Procedure for Removing Battery Pack

A procedure for removing the battery pack 11 from the motorcycle 1 (more specifically, the battery case 20) will be described. First, the lock of the outer lid 30 by the lock mechanism 40 is released by a key operation, and then, as shown in FIG. 4, the outer lid is pivoted from the closed position to the open position.

Next, the casing 70 is removed from the accommodation space S to the outside through the upper opening P1.

Figure 7:
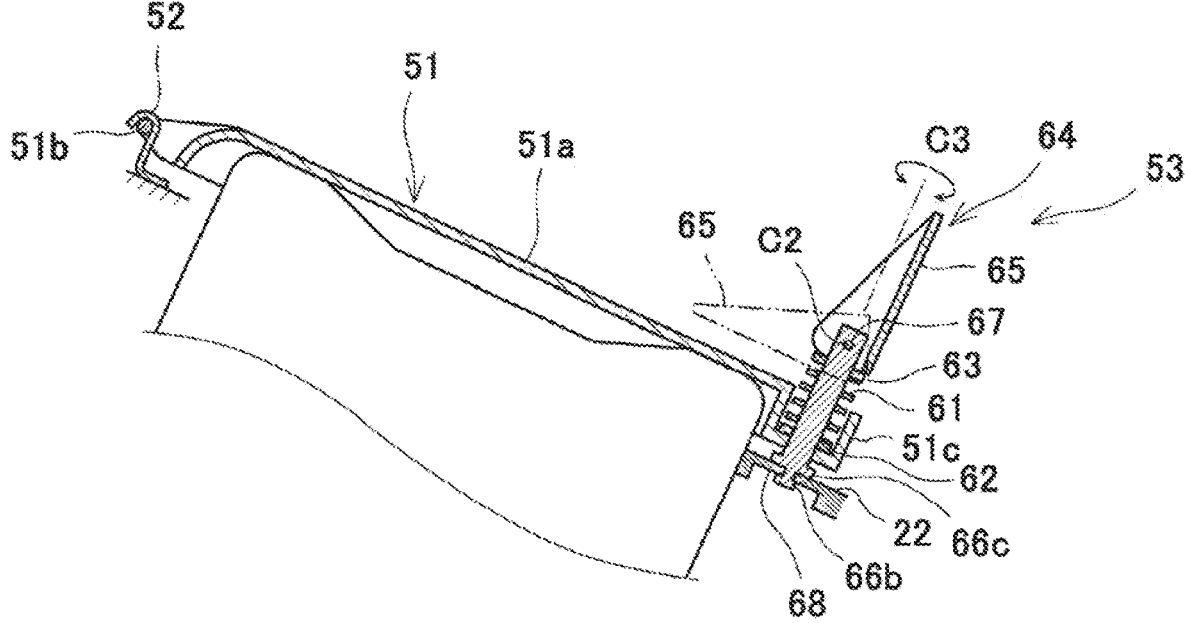
FIG. 7 is a side cross-sectional view of the vicinity of the inner lid shown in FIG. 1 illustrating a pressing release operation of the inner lid.
Figure 8:
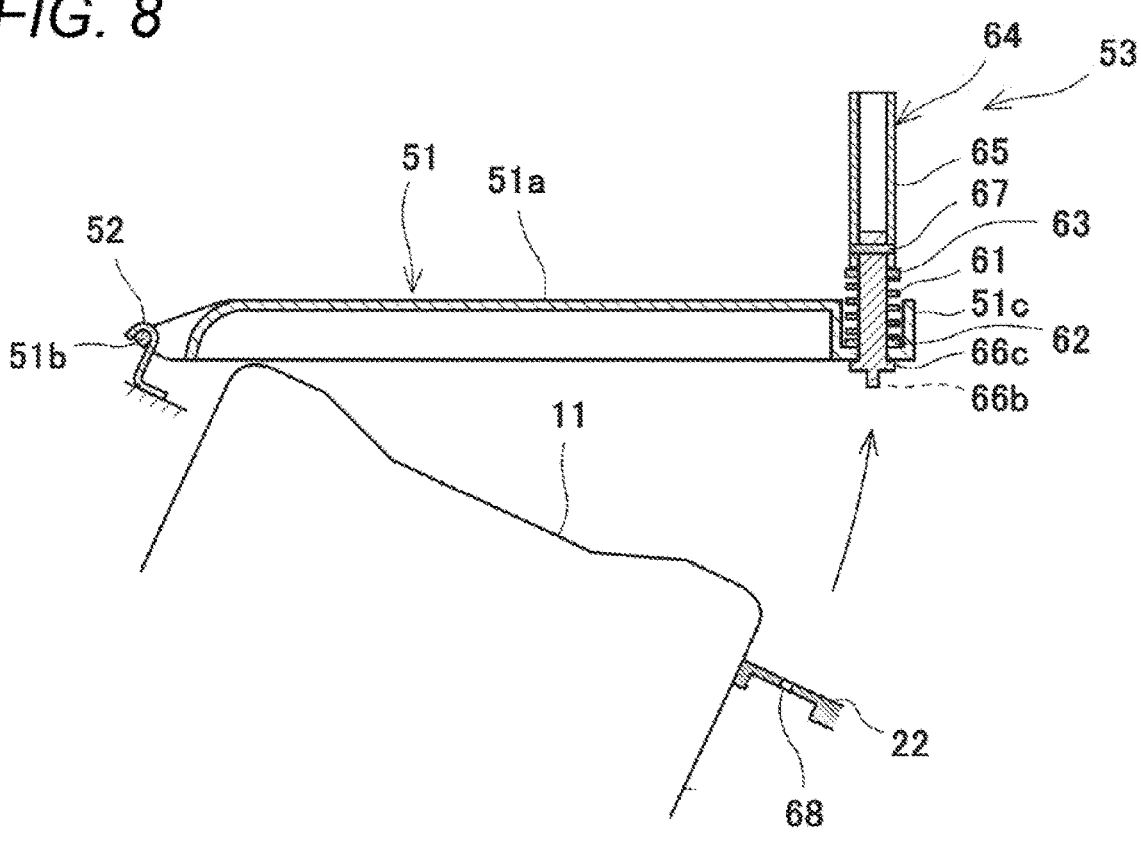
FIG. 8 is a side cross-sectional view of the vicinity of the inner lid shown in FIG. 1 illustrating an opening operation of the inner lid.

Next, as shown in FIG. 7, the cam lever 65 is pivoted about the axis C2 to reduce a pressing force of the compression spring 61. Then, the cam lever 65 is pivoted about the axis C3, and the locking portion 66*b* is aligned with a direction in which the locking portion 66*b* can be inserted into the locked hole 68. After that, as shown in FIG. 8, by lifting the cam lever 65 upward, the inner lid 51 is pivoted about the axis C1 of the engaged shaft 51*b*. Next, after the inner lid 51 is moved such that the engaged shaft 51*b* is disengaged from the engaging hook 52, the inner lid 51 is removed from the accommodation space S through the upper opening P1. Then, the battery pack 11 in the case main body 21 is pulled out upward and removed to the outside from the accommodation space S through the upper opening P1.

In this way, the removal of the battery pack 11 from the motorcycle 1 is completed. The accommodation of the battery pack 11 in the motorcycle 1 can be performed by a procedure reverse to the removal of the battery pack 11.

Operation and Effect

As described above, according to the motorcycle 1 of the present embodiment, the inner lid 51 abutting against the battery pack 11 is held in a state of being pressed toward the battery pack 11. This makes it possible to prevent the battery pack 11 from moving in the battery case 20. In addition, since the outer lid 30 bypasses the pressing mechanism 50 and is connected to the battery case 20, the outer lid 30 does not receive a pressing reaction force of the battery pack 11, and the degree of freedom of design can be improved. For example, the outer lid 30 can be specialized in a structure that prevents rainwater or the like from entering the battery case 20 without considering the pressing reaction force for fixing the battery pack 11. As a result, a simple configuration of the lid body can be implemented, and the movement of the battery pack 11 can be prevented.

In the present embodiment, since the pressing mechanism 50 is disposed in the accommodation space S, the pressing mechanism 50 is protected by the battery case 20, and it is possible to prevent foreign matter (for example, sand, small stones, rainwater, or the like) from adhering to the pressing mechanism 50 and prevent damage to the pressing mechanism 50.

In the present embodiment, since the inner lid 51 is detachable from the battery case 20, it is possible to prevent interference with the inner lid 51 in attaching/detaching the battery pack 11 to/from the battery case 20 and to facilitate the attachment and detachment.

In the present embodiment, it is possible to prevent an accommodation object accommodated in the casing 70 from coming into contact with the retainer 53 by the second partition wall 73.

In the present embodiment, the single pressing mechanism 50 can both lock the inner lid 51 abutting against the battery pack 11 to the battery case 20 and press the battery pack 11 downward.

In the present embodiment, both the operation of locking the inner lid 51 to the battery case 20 and the operation of pressing the battery pack 11 downward can be performed by the operating member 64. In the present embodiment, since the displacement of the locking portion 66*b* and the pressing portion 65*a* can be implemented by the operation of the cam lever 65, it is possible to improve the operability as compared with a case in which the locking operation and the pressing operation are performed with a plurality of operators different from each other. According to the above configurations, a user can generate a biasing force for biasing the inner lid 51 downward by an intuitive and easy-to-understand operation of tilting or lifting the cam lever 65.

In the present embodiment, the engaging member 52 is engaged with the inner lid 51 on a side opposite to the pressing mechanism 50 with the battery pack 11 interposed therebetween. Therefore, compared to the case in which the pressing mechanisms 50 are provided on both sides of the battery pack 11, the number of pressing mechanisms 50 can be reduced.

Second Embodiment

Figure 9:
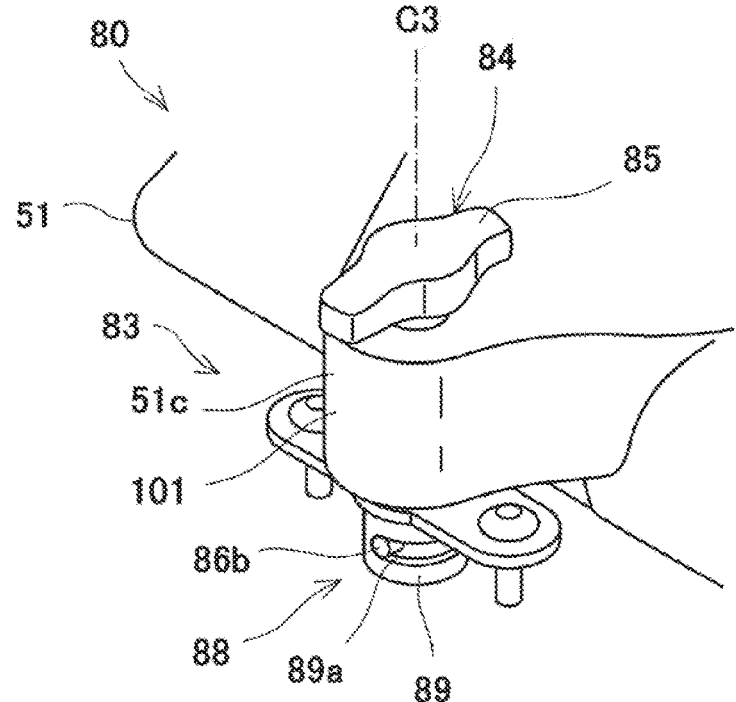
FIG. 9 is an enlarged perspective view of the vicinity of a retainer in a pressing state of a motorcycle according to a second embodiment.
Figure 10:
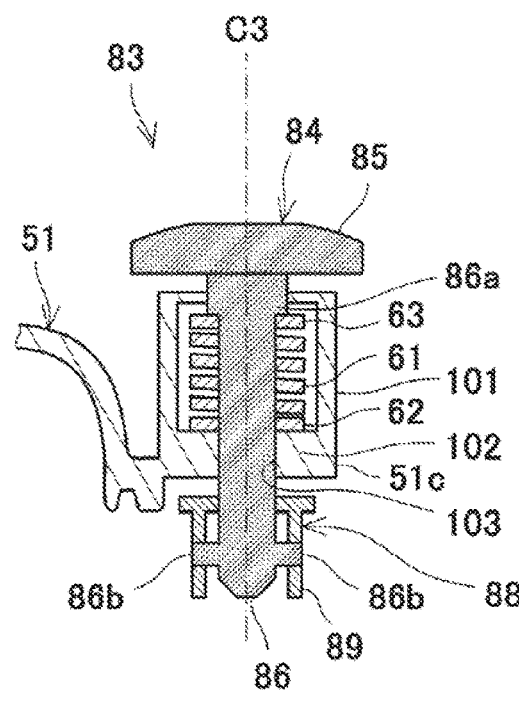
FIG. 10 is a side cross-sectional view of the retainer according to the second embodiment.
Figure 11:
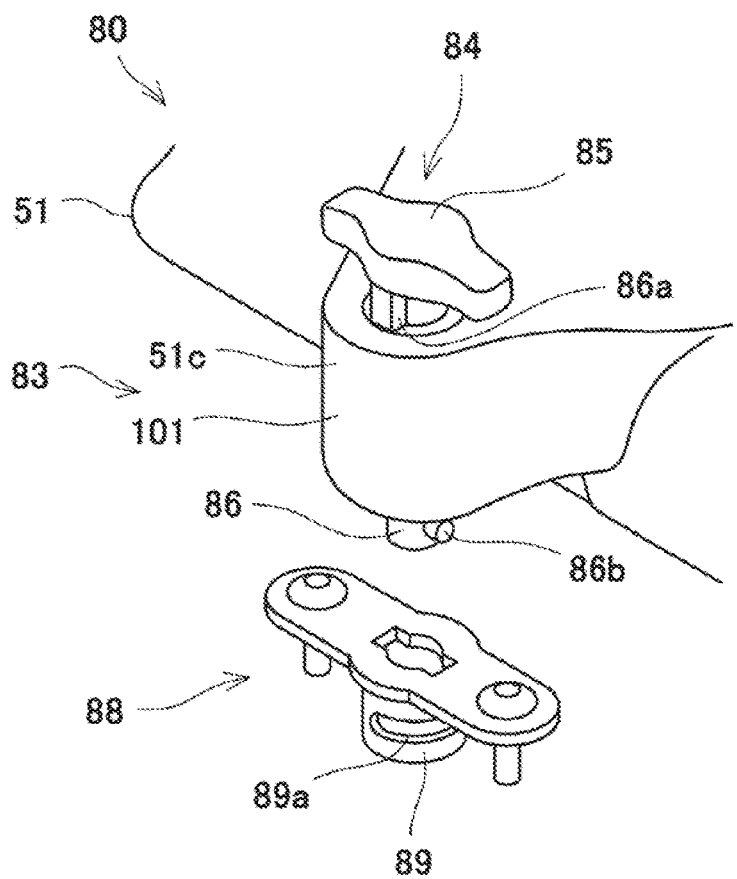
FIG. 11 is a diagram illustrating a state in which an inner lid is slightly opened in the second embodiment.

Next, a motorcycle according to a second embodiment will be described with reference to FIGS. 9 to 11. In the second embodiment, the same components as those of the first embodiment are denoted by the same reference numerals, and the description thereof is omitted. FIG. 9 is an enlarged perspective view of the vicinity of a retainer 83 in a pressing state of a pressing mechanism 80 in the second embodiment. FIG. 10 is a side cross-sectional view of the retainer 83. FIG. 11 is a diagram illustrating a state in which the inner lid 51 of the pressing mechanism 80 is slightly opened.

The present embodiment differs from the first embodiment in the structure of the retainer in the pressing mechanism. More specifically, in the pressing mechanism 50 of the first embodiment, the retainer 53 is of a cam lever type, whereas in the pressing mechanism 80 of the present embodiment, the retainer 83 is of a cylindrical cam type. Similarly to the retainer 53 of the first embodiment, when the inner lid 51 is at the closed position, the retainer 83 is disposed behind the lower opening P2 in the base 22 (more specifically, the lower base frame 24). Similarly to the retainer 53, the retainer 83 has both functions of a pressing function of pressing the inner lid 51 and a locking function of locking the inner lid 51 to the battery case 20.

The retainer 83 includes the compression spring 61, the first spring seat 62, the second spring seat 63, an operating member 84, and a locked portion 88. Configurations of the compression spring 61, the first spring seat 62, the second spring seat 63, and the support portion 51*c* of the inner lid 51 that supports the compression spring 61, the first spring seat 62, and the second spring seat 63 are the same as those of the above embodiment, and thus the description thereof will be omitted.

The operating member 84 is connected to the inner lid 51 so as to be displaceable. For example, the operating member 84 is connected to the support portion 51*c* of the inner lid 51 so as to be rotatable about the axis C3. The operating member 84 is connected to the support portion 51*c* of the inner lid 51 so as to be displaceable with respect to the inner lid 51 in the direction of the axis C3.

The operating member 84 includes a rotating handle 85 that a user operates with hands, and a rotating shaft 86. The rotating handle 85 corresponds to an operator. The rotating handle 85 is disposed on a side opposite to the compression spring 61 with respect to the second spring seat 63. The rotating handle 85 is a handle for rotating about the axis C3 of the cylindrical portion 101. In the present embodiment, the rotating handle 85 has a point-symmetrical shape about the axis C3.

The rotating handle 85 is fixed to one end portion of the rotating shaft 86. The rotating shaft 86 is inserted radially inside the second spring seat 63, the compression spring 61, and the first spring seat 62. The rotating shaft 86 is also inserted into the through hole 103 of the bottom 102 of the cylindrical portion 101 of the support portion 51*c*.

The rotating shaft 86 includes a pressing portion 86*a* and a locking portion 86*b*. The pressing portion 86*a* is positioned on the side opposite to the compression spring 61 with respect to the second spring seat 63. The pressing portion 86*a* presses the second spring seat 63 toward the compression spring 61. The second spring seat 63 is sandwiched between the pressing portion 86*a* and the compression spring 61.

The locking portion 86*b* is a pin-shaped protrusion protruding in a direction perpendicular to the axis C3. Hereinafter, the locking portion 86*b* may be referred to as a locking pin 86*b*. The locking pin 86*b* is positioned on a side opposite to the compression spring 61 from the through hole 103.

The locking pin 86*b* has a size or a shape that cannot be inserted into the through hole 103. Therefore, when an operation of lifting the operating member 84 upward is performed, the inner lid 51 is also lifted supported by the locking pin 86*b*.

The locked portion 88 includes a hollow cylindrical cam 89 fixed to the battery case 20. The cylindrical cam 89 has a size that can be engaged with the locking pin 86*b*. That is, an inner diameter of the cylindrical cam 89 is shorter than a length from the axis C3 to an end portion on a radially outer side of the locking pin 86*b*.

The cylindrical cam 89 has an engaging hole 89*a* that can be engaged with the locking pin 86*b*. An upper end of the engaging hole 89*a* is at an upper end edge of the cylindrical cam 89, and the locking pin 86*b* can move in and out in a vertical direction with respect to the engaging hole 89*a* from the upper end of the engaging hole 89*a*. The engaging hole 89*a* has a spiral shape that guides the locking pin 86*b* downward when the operating member 84 rotates about the axis C3 extending in a biasing direction of the compression spring 61. A lower end portion of the engaging hole 89*a* has a shape that holds the locking pin 86*b*. For example, the lower end portion of the engaging hole 89*a* may have a shape extending along a surface perpendicular to a central axis of the cylindrical cam 89.

In the pressing mechanism 80, by rotating the rotating handle 85 about the axis C3 when the inner lid 51 is at an abutment position, both locking of the inner lid 51 with respect to the battery case 20 and holding of the inner lid 51 in a state of being pressed downward can be performed at once. When the inner lid 51 is at the abutment position, more specifically, when the rotating handle 85 is rotated while being pressed downward, the locking pin 86*b* is inserted into the engaging hole 89*a* and guided downward spirally to reach the lower end portion of the engaging hole 89*a*. In this way, a biasing force of the compression spring 61 is generated or increased in a direction in which the inner lid 51 is pressed downward. Since the locking pin 86*b* is held at the lower end portion of the engaging hole 89*a*, the inner lid 51 can be locked to the battery case 20 in a state of being pressed downward.

A procedure for removing the battery pack 11 from the motorcycle 1 (more specifically, the battery case 20) including the pressing mechanism 80 will be described. Pivoting the outer lid 30 from a closed position to an open position and removing the casing 70 to the outside from the accommodation space S through the upper opening P1 are the same as the procedure for removing the battery pack 11 described in the above embodiment.

After the outer lid 30 is moved to the open position and the casing 70 is removed, the rotating handle 85 of the retainer 83 in the pressing state shown in FIG. 9 is rotated about the axis C3, whereby the locking pin 86*b* is spirally moved upward from the lower end portion (that is, a locking position) of the engaging hole 89*a*. Since the pressing portion 86*a* also gradually rises together with the locking pin 86*b*, the biasing force of the compression spring 61 is gradually reduced. After the rotating handle 85 is rotated to a rotation position (that is, an unlocking position) where the locking pin 86*b* can be pulled out of the engaging hole 89*a*, the rotating handle 85 is lifted upward. As a result, as shown in FIG. 11, the locking pin 86*b* exits the engaging hole 89*a* from an upper end of the cylindrical cam 89, and the inner lid 51 pivots about the axis C1 of the engaged shaft 51*b*. Since the subsequent procedure is the same as the procedure described in the first embodiment, the description thereof will be omitted.

Third Embodiment

Figure 12:
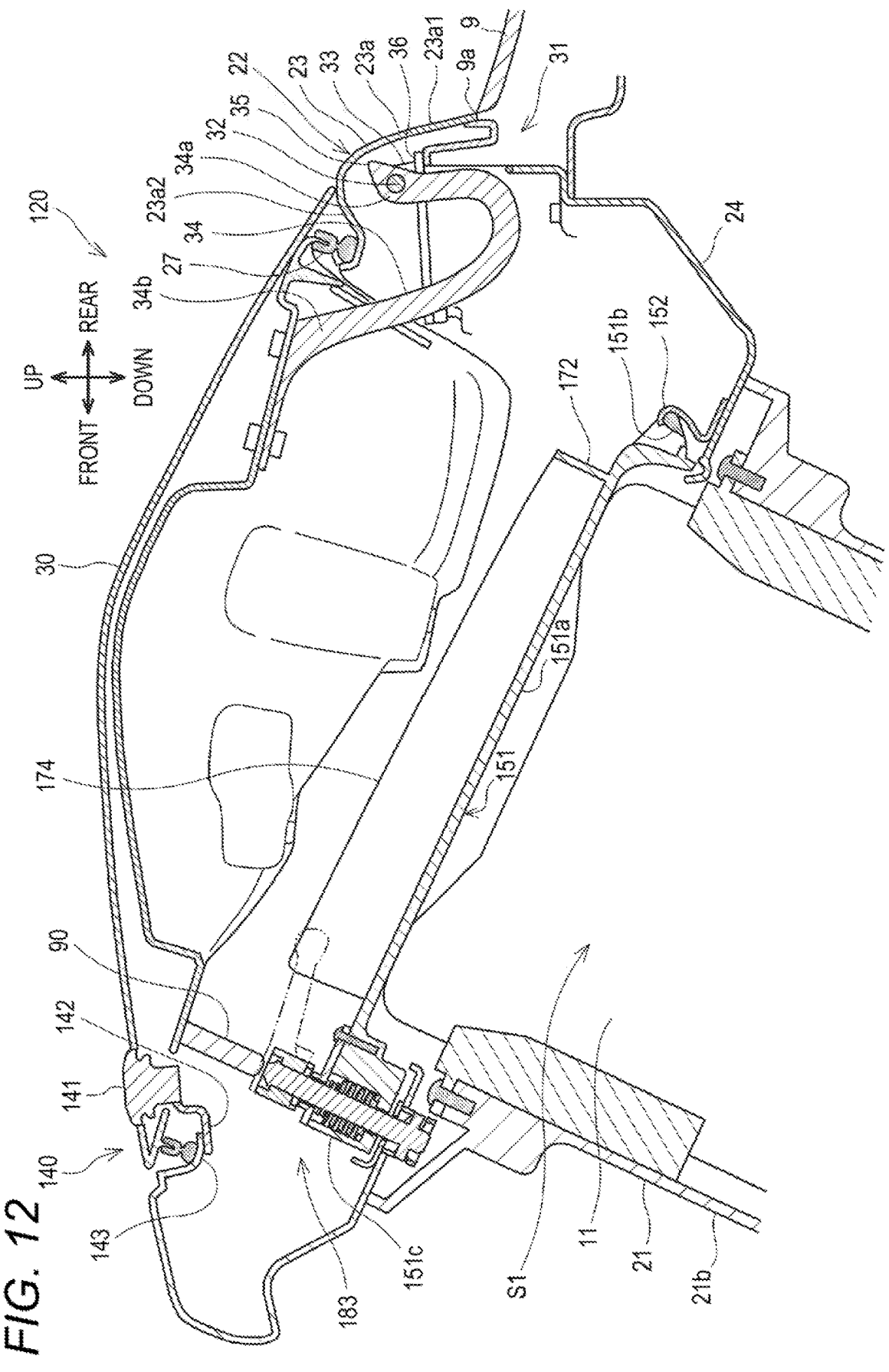
FIG. 12 is an enlarged side cross-sectional view of the vicinity of an upper portion of a battery case of a motorcycle according to a third embodiment.

Next, a motorcycle according to a third embodiment will be described with reference to FIGS. 12 to 15. In the third embodiment, the same components as those of the first and second embodiments are denoted by the same reference numerals, and the description thereof is omitted. FIG. 12 is an enlarged side cross-sectional view of the vicinity of an upper portion of a battery case 120 of the motorcycle according to the third embodiment.

A pressing mechanism 150 in the present embodiment includes an inner lid 151, an engaging member 152, and a retainer 183. Basically, roles of the inner lid 151, the engaging member 152, and the retainer 183 in the pressing mechanism 150 are respectively the same as those of the inner lid 51, the engaging member 52, and the retainers 53 and 83 in the pressing mechanisms 50 and 80 of the first and second embodiments. However, positions and structures of the inner lid 151, the engaging member 152, and the retainer 183 in the pressing mechanism 150 are respectively slightly different from those of the inner lid 51, the engaging member 52, and the retainers 53 and 83 in the pressing mechanism 50 and 80 of the first and second embodiments.

For example, in the pressing mechanism 150 according to the present embodiment, the positions of the engaging member 152 and the retainer 183 are opposite to the positions of the engaging member 52 and the retainers 53 and 83 in the pressing mechanism 80 of the first and second embodiments. As shown in FIG. 12, the engaging member 152 is disposed behind the lower opening P2 in the base 22 (more specifically, the lower base frame 24). When the inner lid 151 is at an abutment position, the retainer 183 is disposed in front of the lower opening P2 in the base 22 (more specifically, the lower base frame 24).

Figure 13:
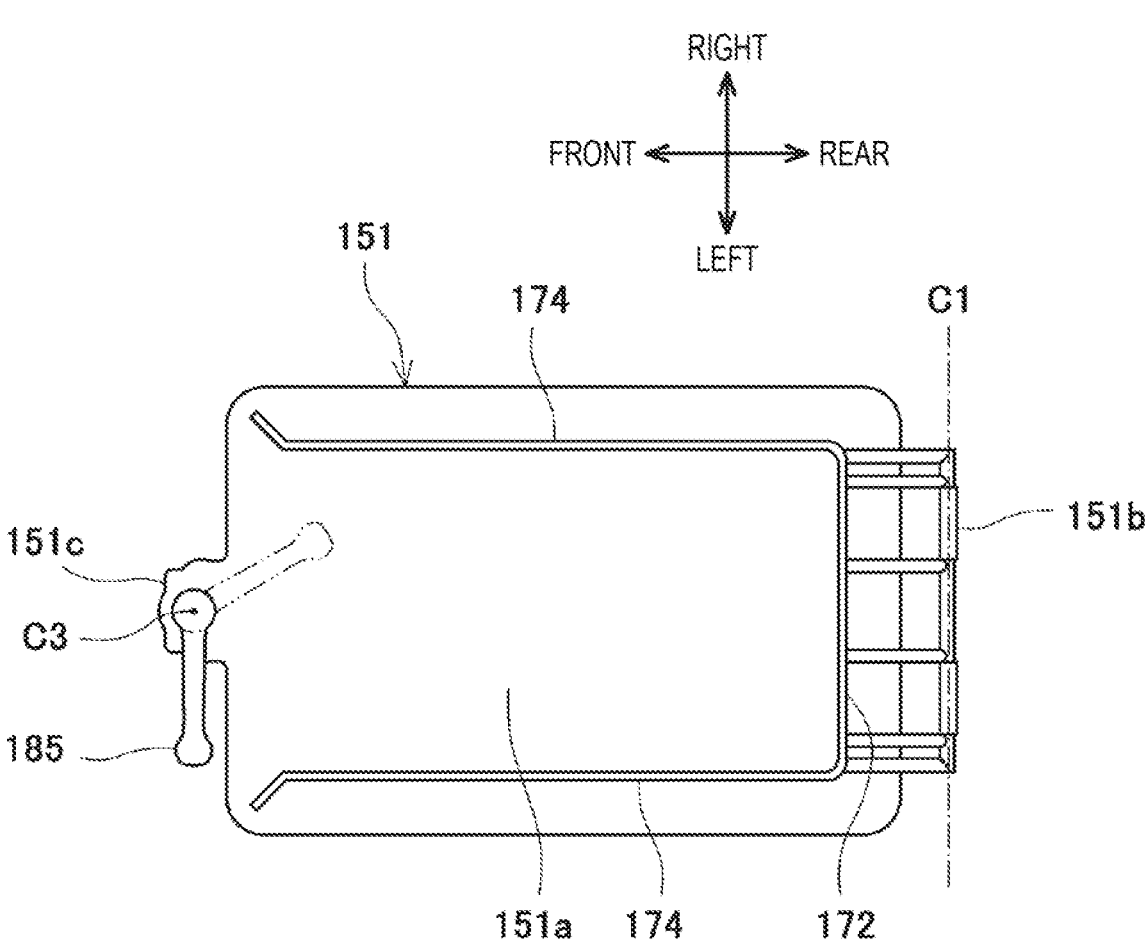
FIG. 13 is a top view of an inner lid according to the third embodiment.
Figure 14:
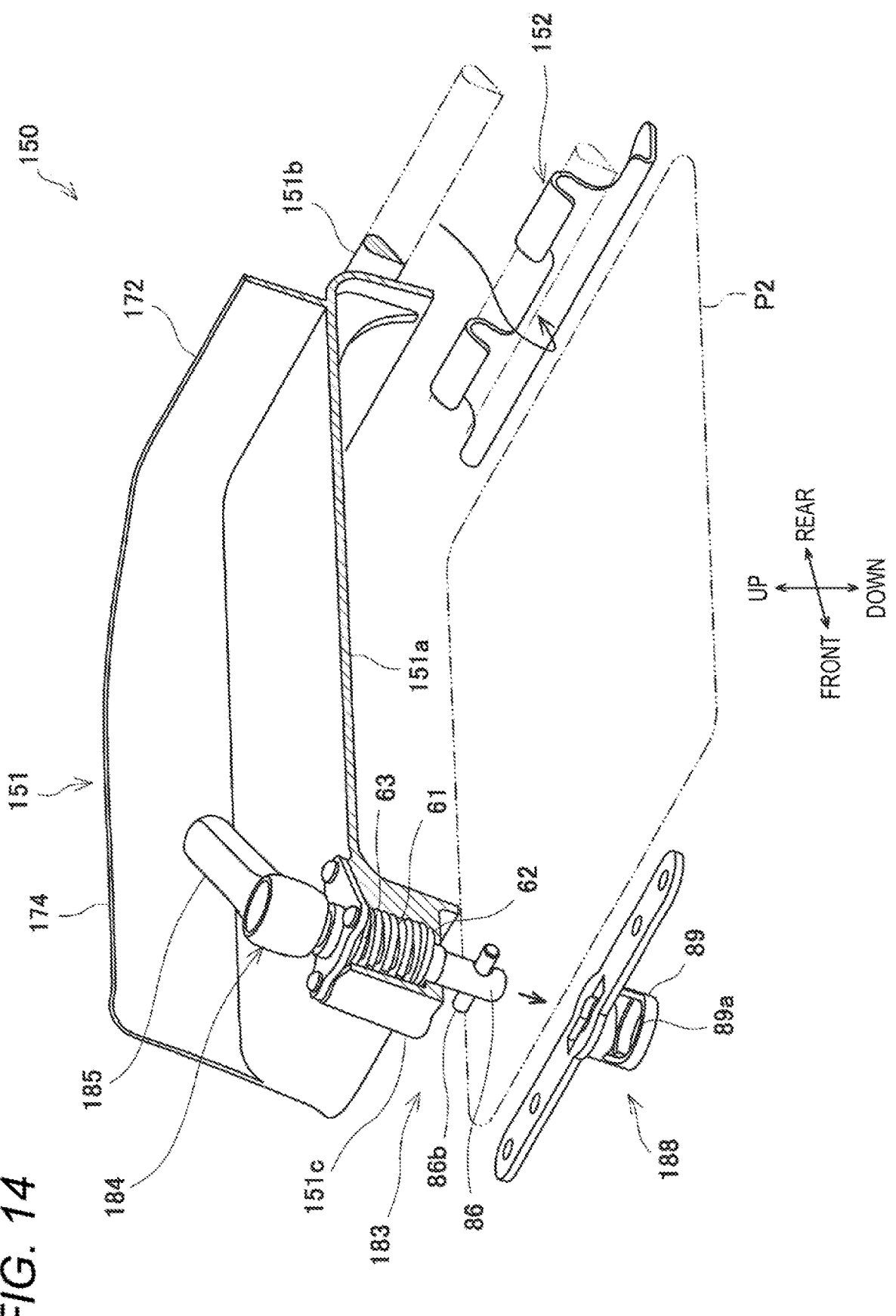
FIG. 14 is a perspective view illustrating a configuration of a pressing mechanism according to the third embodiment.

FIG. 13 is a top view of the inner lid 151 in the third embodiment. FIG. 14 is a perspective view illustrating a configuration of the pressing mechanism 150 according to the third embodiment. In FIG. 14, a left half of the inner lid 151 is omitted such that the structure of the retainer 183 is easy to see.

In the present embodiment as well, the inner lid 151 is detachable from the battery case 120. As shown in FIG. 13, the inner lid 151 includes a lid main body 151*a*, an engaged portion 151*b*, and a support portion 151*c*. The lid main body 151*a* closes the lower opening P2 when the inner lid 151 is at the abutment position where the inner lid 151 abuts the battery pack 11.

In the present embodiment, a partition wall 172 and a pair of side walls 174 are provided on an upper surface of the lid main body 151*a*. The partition wall 172 rises upward from the vicinity of an end edge portion on a rear side of the lid main body 151a. The pair of side walls 174 extend forward from both left and right ends of the partition wall 172. A space sandwiched between the pair of side walls 174 in an acting direction functions as a luggage accommodation space for accommodating luggage as an accommodation object. The partition wall 172 prevents an accommodation object placed on the upper surface of the lid main body 151a from moving to the rear of the lid main body 151a, that is, a space in which the engaging member 152 is disposed (see FIG. 12). As described above, in the present embodiment, since the inner lid 151 itself functions as a casing on which the accommodation object is placed, it is not necessary to separately mount the casing 70 on the inner lid 151 as in the first and second embodiments.

The engaged portion 151b is fixed to a rear end portion of the lid main body 151a. The engaged portion 51b can be engaged with the engaging member 152 fixed to the battery case 20. The engaged portion 151b has a rod shape extending in the left-right direction. Hereinafter, the engaged portion 151b may also be referred to as an engaged shaft 151b.

As shown in FIG. 14, the engaging member 152 has an engaging structure that can be attached to and detached from the inner lid 151. The inner lid 151 is pivotable about the axis C1 of the engaged shaft 151b in a state in which the engaged shaft 151b is engaged with the engaging member 152. The engaging member 152 has a hook shape similar to the engaging member 52. The hook shape of the engaging member 152 is a hook shape that is open to the lower opening P2, but may be a hook shape that is open to the side opposite to the side where the lower opening P2 is positioned.

As shown in FIG. 14, the support portion 151c is fixed to a side opposite to the engaged portion 151b of the lid main body 151a, that is, to a front end portion of the lid main body 151a. The support portion 151c supports the later-described compression spring 61 and the like, which are components of the retainer 53. When the inner lid 151 is at the abutment position, the retainer 183 is disposed in front of the lower opening P2 in the base 22 (more specifically, the lower base frame 24).

The retainer 183 holds the inner lid 151 abutting against the battery pack 11 while pressing the inner lid 151 toward the battery pack 11. That is, the retainer 183 has a pressing function of pressing the inner lid 151 downward when the inner lid 151 is at the abutment position. The retainer 183 also has a locking function of locking the inner lid 151 to the battery case 120 when the inner lid 151 is at the abutment position.

The retainer 183 includes the compression spring 61, the first spring seat 62, the second spring seat 63, an operating member 184, and a locked portion 188. Since configurations of the compression spring 61, the first spring seat 62, and the second spring seat 63 of the retainer 183, and the support portion 151c of the inner lid 151 that supports the compression spring 61, the first spring seat 62, and the second spring seat 63 are the same as those of the first and second embodiments, the description thereof will be omitted.

Similarly to the retainer 83 of the second embodiment, the retainer 183 of the present embodiment is of a cylindrical cam type. The operating member 184 includes a rotating handle 185 that a user operates with hands, and the rotating shaft 86. The rotating handle 85 of the operating member 84 of the second embodiment has a point-symmetrical shape about the axis C3, whereas the operating member 184 of the present embodiment has a shape in which the rotating handle 185 extends only in one direction from the axis C3. Since the operating member 184 of the retainer 183 and the operating member 84 of the second embodiment have substantially the same configuration except for the shape of the rotating handle 185, the description of the rotating shaft 86 of the operating member 184 and the like is omitted.

Similarly to the second embodiment, the locked portion 188 includes the cylindrical cam 89. Since the locked portion 188 of the retainer 183 has the same configuration as the locked portion 88 of the second embodiment, the description of the locked portion 188 is omitted.

In the present embodiment as well, similarly to the second embodiment, by rotating the rotating handle 185 about the axis C3 when the inner lid 151 is at the abutment position, both locking of the inner lid 151 with respect to the battery case 120 and holding of the inner lid 151 in a state of being pressed downward can be performed at once. When the inner lid 151 is at the abutment position, more specifically, when the rotating handle 185 is rotated while being pressed downward, the locking pin 86b is inserted into the engaging hole 89a and guided downward spirally to reach a lower end portion (that is, a locking position) of the engaging hole 89a. At this time, as shown in FIG. 13, in the present embodiment, the rotating handle 185 is in a state of extending in a left direction from the axis C3. Since the locking pin 86b is held at the lower end portion of the engaging hole 89a, the inner lid 151 can be locked to the battery case 120 in a state of being pressed downward.

In the present embodiment, as shown in FIG. 12, the outer lid 30 is provided with a protruding member 90 protruding downward from a back surface of the outer lid 30, that is, from the outer lid 30 at a closed position. In the present embodiment, the protruding member 90 is a rod-shaped body attached to the outer lid 30, but the shape of the protruding member is not particularly limited. Although the protruding member 90 interferes with the retainer 183 in a pressing-released state when the outer lid 30 is closed, a protruding position and a length in a protruding direction from the outer lid are adjusted so as not to interfere with the retainer 183 in a pressing state. This will be described with reference to FIG. 15.

Figure 15:
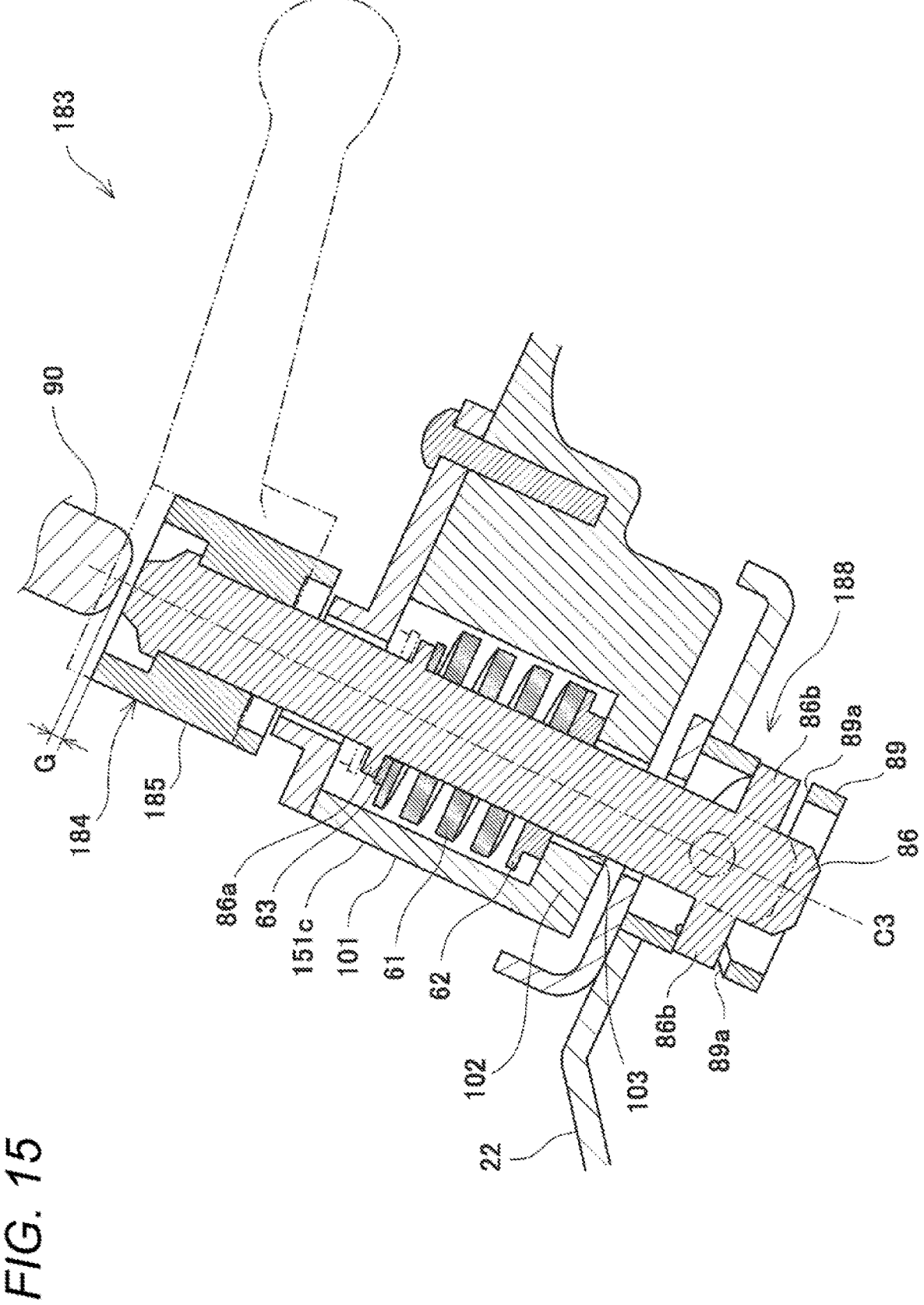
FIG. 15 is a side cross-sectional view showing the vicinity of a retainer in a pressing state in the third embodiment.

FIG. 15 is an enlarged side cross-sectional view showing the vicinity of the retainer 183 in the pressing state in the third embodiment. FIG. 15 also shows a lower end of the protruding member 90 when the outer lid 30 is at a closed position. In the present embodiment, when the outer lid 30 is closed, the protruding member 90 is attached to the outer lid 30 such that the protruding member 90 is positioned on the axis C3 of the rotating shaft 86 of the operating member 184. Since there is a small gap G between the retainer 183 in the pressing state and the protruding member 90 protruding from the outer lid 30 in a closed state, the retainer 183 in the pressing state does not interfere with the protruding member 90.

In FIG. 15, the rotating handle 185 of the retainer 183 in the pressing-released state is indicated by a two-dot chain line. A position of the operating member 184 of the retainer 183 in the pressing-released state is higher than that of the operating member 184 of the retainer 183 in the pressing state, and the operating member 184 of the retainer 183 in the pressing-released state and the protruding member 90 interfere with each other. Therefore, even when the outer lid 30 is pivoted from an open position while the retainer 183 is in the pressing-released state, it is possible to prevent the outer lid 30 from being closed while the retainer 183 is in the pressing-released state due to the interference between the operating member 184 and the protruding member 90.

As shown in FIG. 15, in the present embodiment, the protruding member 90 is provided on the outer lid 30 so as to interfere with the rotating shaft 86 of the retainer 183 in the pressing-released state, but the protruding member 90 may be provided on the outer lid 30 so as to interfere with other elements of the retainer 183 in the pressing-released state, for example, the rotating handle 185.

In the present embodiment, a lock mechanism 140 for holding the outer lid 30 at the closed position is also different from the lock mechanism 40 described in the first embodiment. Specifically, similarly to the lock mechanism 40 of the first embodiment, the lock mechanism 140 of the present embodiment includes an insertion port 141, a lock movement portion 142, and a lock fixing portion 143. However, the insertion port 141 and the lock movement portion 142 are provided on the outer lid 30 instead of on the base 22. The lock fixing portion 43 is provided on the base 22, more specifically on the upper base frame 23 instead of on the outer lid 30. In this way, by providing the lock movement portion 142, which is a movable portion, on the outer lid 30, a portion of the upper base frame 23 on a front side of the outer lid 30 can be made small, and as a result, the upper opening P1 can be designed to be large. As a result, it is easy to design the upper opening P1 that allows the battery pack 11 and the inner lid 151 to pass therethrough.

Fourth Embodiment

Figure 16:
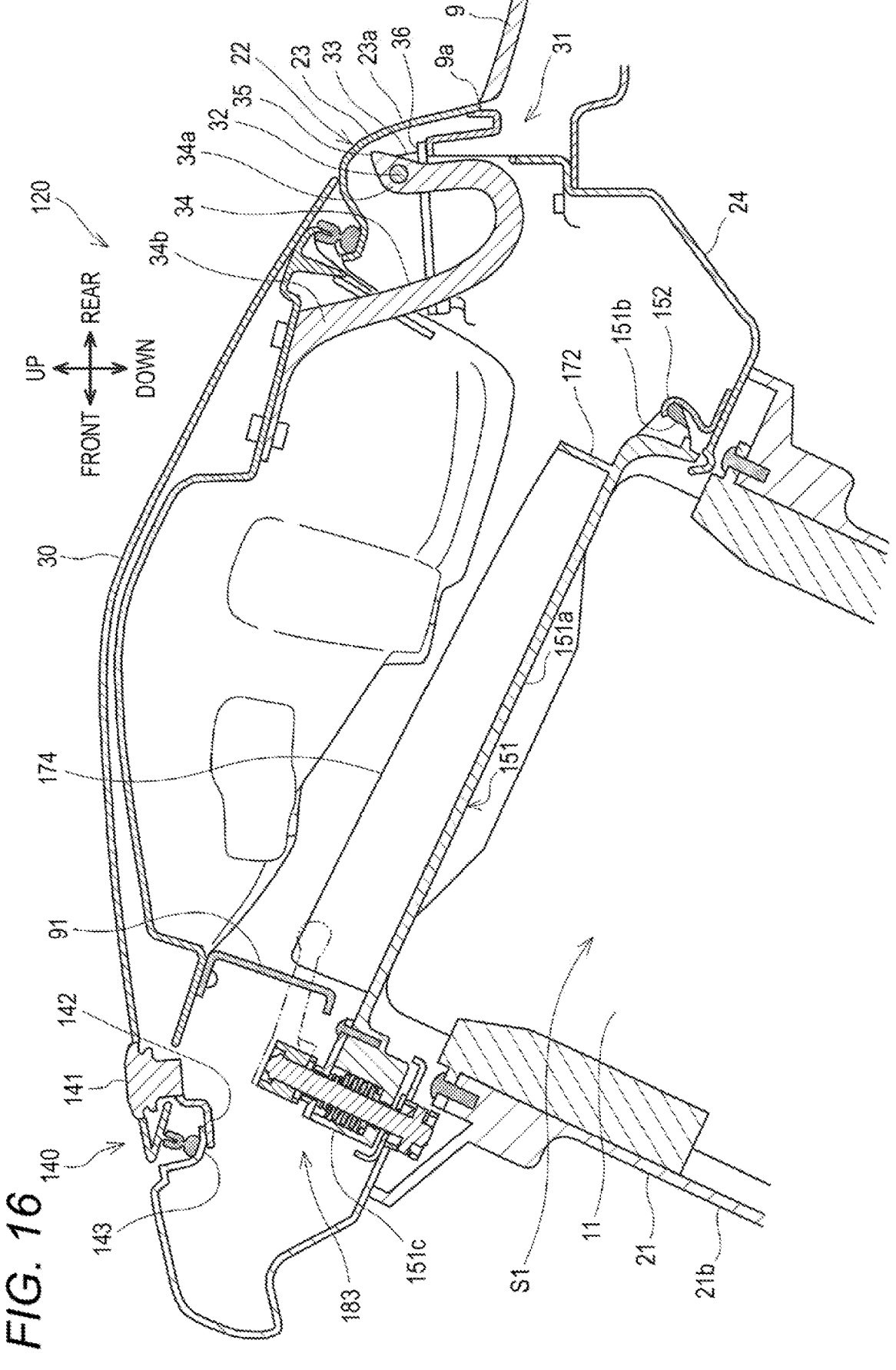
FIG. 16 is an enlarged side cross-sectional view of the vicinity of an upper portion of a battery case of a motorcycle according to a fourth embodiment.
Figure 17:
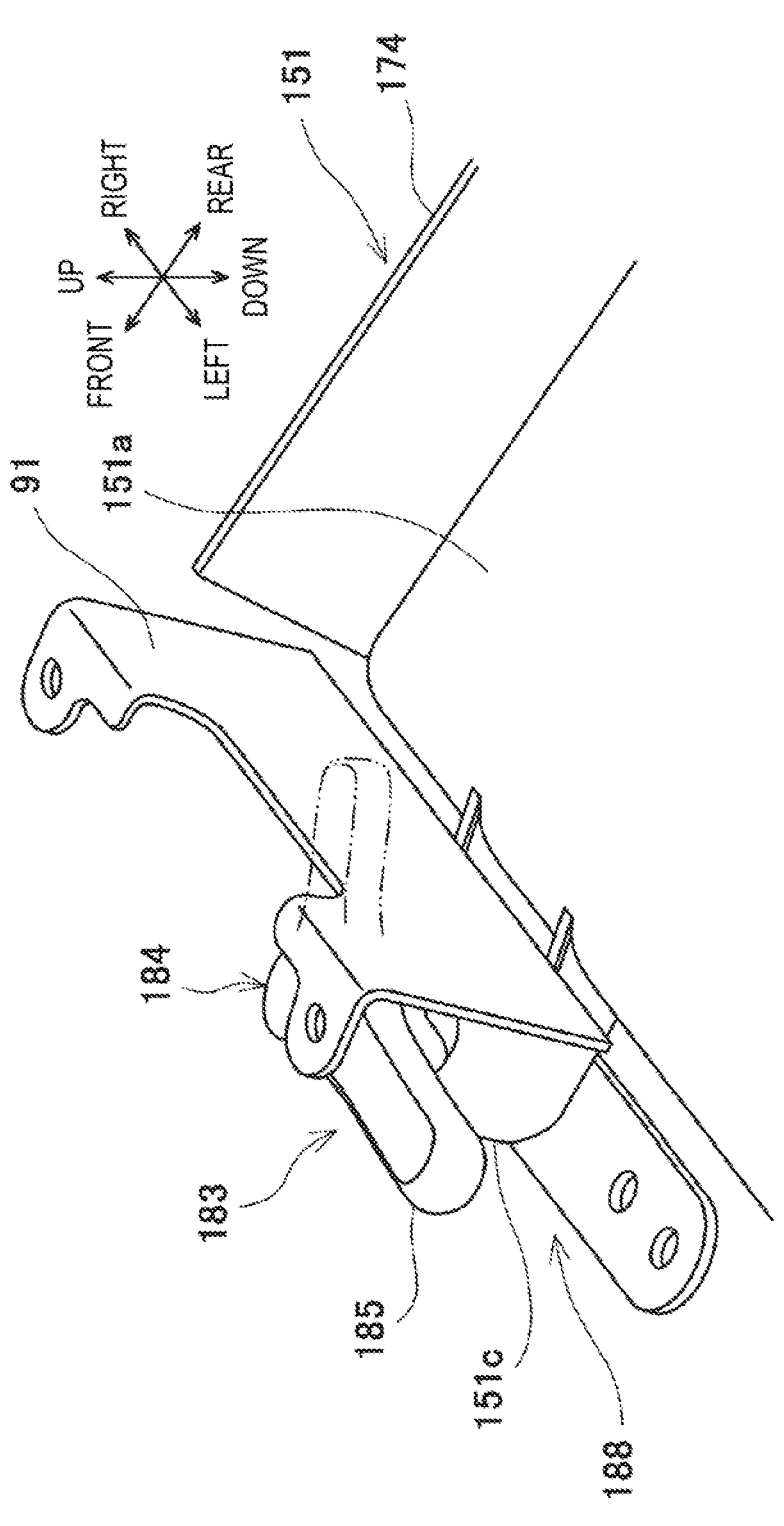
FIG. 17 is an enlarged perspective view of a part of an accommodation space in the fourth embodiment.

Next, a motorcycle according to a fourth embodiment will be described with reference to FIGS. 16 and 17. In the fourth embodiment, the same components as those of the first to third embodiments are denoted by the same reference numerals, and the description thereof is omitted. FIG. 16 is an enlarged side cross-sectional view of the vicinity of an upper portion of a battery case of the motorcycle according to the fourth embodiment. FIG. 17 is an enlarged perspective view of a part of an accommodation space in the fourth embodiment.

As shown in FIG. 16, in the present embodiment, a partition plate 91 protrudes downward as a protruding member from the outer lid 30 at a closed position. The partition plate 91 interferes with the retainer 183 in a pressing-released state when the outer lid 30 is closed, but a protruding position and a length in a protruding direction from the outer lid 30 are adjusted so as not to interfere with the retainer 183 in a pressing state.

Specifically, as shown in FIG. 17, when the retainer 183 is in the pressing state, the rotating handle 185 is in a state of extending in a left direction from the axis C3 (see FIG. 13 as well). That is, when the retainer 183 is in the pressing state, the lid main body 151*a* and the rotating handle 185 do not overlap each other in a top view of the inner lid 151.

On the other hand, the partition plate 91 is provided on the outer lid 30 so as to be positioned directly above a front end portion of the lid main body 151*a*, that is, an end portion of the lid main body 151*a* on a side where the support portion 151*c* is positioned when the outer lid 30 is closed. Therefore, when the outer lid 30 is closed while the retainer 183 is in the pressing state, the partition plate 91 does not interfere with the rotating handle 185.

In FIGS. 16 and 17, the rotating handle 185 of the retainer 183 in the pressing-released state is indicated by a two-dot chain line. When the retainer 183 is in the pressing-released state, the rotating handle 185 is in a state of extending from the axis C3 toward the lid main body 151*a* (see the two-dot chain line in FIG. 13 as well). That is, when the retainer 183 is in the pressing-released state, the lid main body 151*a* and the rotating handle 185 overlap each other in a top view of the inner lid 151. Therefore, when the outer lid 30 is closed while the retainer 183 is in the pressing-released state, the partition plate 91 interferes with the rotating handle 185.

Therefore, even when the outer lid 30 is pivoted from an open position while the retainer 183 is in the pressing-released state, it is possible to prevent the outer lid 30 from being closed while the retainer 183 is in the pressing-released state due to the interference between the operating member 184 and the partition plate 91 as a protruding member.

In the present embodiment, when the outer lid 30 is closed while the retainer 183 is in the pressing state, the partition plate 91 partitions the accommodation space S into a space in which the retainer 183 is disposed and a luggage accommodation space above the lid main body 151*a*. Therefore, the partition plate 91 prevents an accommodation object placed on an upper surface of the lid main body 151*a* from moving forward of the lid main body 151*a*, that is, into the space where the retainer 183 is disposed.

Other Embodiments

The present disclosure is not limited to the above embodiments, and the configuration may be changed, added, or deleted.

For example, in the above embodiments, the straddle-type vehicle is an electric vehicle in which the traveling drive source is an electric motor, but may be a vehicle provided with an engine as the traveling drive source. The battery pack may be a battery pack capable of supplying electric power to an electric motor that assists the engine drive, instead of the traveling drive source. The straddle-type vehicle may be an electrically assisted bicycle that assists human power by an electric motor.

A configuration, posture, and the like of the battery case are not limited to those described in the above embodiments. In the above embodiments, the battery case has a configuration in which the case main body and the base are connected to each other, but the battery case may have a configuration in which the case main body and the base are integrated with each other. For example, in the above embodiments, the base 22 may be only the upper base frame 23, and the lower base frame 24 may be a part of the case main body 21. In this case, the engaging member 52 and the locked portion 68 may be fixed to the case main body 21 instead of the base 22.

In the above embodiments, the base includes the protruding portion, but the base and the protruding portion may be separate from each other.

The pressing mechanism may be an air spring in addition to the compression spring. Alternatively, the pressing mechanism may press the inner lid with a fastener such as a bolt when the inner lid has elasticity. That is, when the inner lid has elasticity, the abutting member itself may be provided with a function of pressing.

The inner lid may include a buffer material at a position where the inner lid abuts the battery pack. In the above embodiments, the abutting member is the inner lid, but the abutting member may not be a lid body that covers the battery pack from above. For example, the abutting member may abut against the battery pack instead of closing the opening P2. For example, the abutting member may be a rod-shaped member or a mesh-shaped member. The inner lid may not be detachable from the battery case.

The operator of the pressing mechanism is a portion that a user touches with hands when operating the pressing mechanism. A shape, a configuration, and the like of the operator are not limited to those described in the embodiments and the modification described above. For example, the operator may be a lever, a handle, a knob, a button, or the like.

The casing as a luggage case includes the partition wall, but the luggage case and the partition wall may be separate from each other. The straddle-type vehicle may not include the luggage case.

In the above embodiments, the battery pack 11 accommodated in the first space S1 and the luggage accommodated in the second space S2 are described as accommodation objects accommodated in the accommodation space S or removed from the accommodation space S, but the accommodation objects are not limited thereto. For example, the battery pack may not be included in the accommodation objects. The case in which the accommodation space is formed may not be the battery case, and may be, for example, a case in which only the luggage can be accommodated. For example, the battery pack may not be detachable from the vehicle body. The straddle-type vehicle may be a vehicle that can travel without a battery pack. The straddle-type vehicle may be a vehicle that uses a traveling drive source other than an electric motor, for example, an internal combustion engine. For example, the accommodation object may be an accessory that is worn by a rider during riding, such as a helmet and gloves. The accommodation object may also be a tool box, a manual, or the like, or may be vehicle parts that are supposed to be detachable from the vehicle body.

Disclosure

Each of the following aspects is a disclosure of a preferred embodiment.

First Aspect

A straddle-type vehicle includes: a battery case having an accommodation space that accommodates a battery pack and an opening for attaching and detaching the battery pack via the opening that opens the accommodation space; a pressing mechanism including an abutting member capable of abutting the battery pack in a state where the battery pack is accommodated in the accommodation space of the battery case, and a retainer that holds the abutting member abutting the battery pack while pressing the abutting member toward the battery pack; and a lid body connected to the battery case while bypassing the pressing mechanism and that opens and closes the opening of the battery case.

According to the above aspect, the abutting member abutting against the battery pack is held in a state of being pressed toward the battery pack. This makes it possible to prevent the battery pack from moving in the battery case. Since the lid body bypasses the pressing mechanism and is connected to the battery case, the lid does not receive a pressing reaction force of the battery pack, and a degree of freedom in design can be improved. For example, the lid body can be specialized in a structure that prevents rainwater or the like from entering the battery case without considering the pressing reaction force for fixing the battery pack. As a result, a simple configuration of the lid body can be implemented, and the movement of the battery pack can be prevented.

Second Aspect

According to the first aspect of the present disclosure, the pressing mechanism may be disposed inside the accommodation space.

According to the above aspect, the pressing mechanism is protected by the battery case, and it is possible to prevent foreign matter (for example, sand, small stones, rainwater, or the like) from adhering to the pressing mechanism and prevent damage to the pressing mechanism.

Third Aspect

According to the first or the second aspect of the present disclosure, the abutting member may be detachable from the battery case.

According to the above aspect, it is possible to prevent interference with the abutting member in attaching/detaching the battery pack to/from the battery case and to facilitate the attachment and detachment.

Fourth Aspect

According to the first to the third aspects of the present disclosure, a thickness direction dimension of the lid body may be smaller than a thickness direction dimension of the abutting member.

According to the above aspect, the abutting member can easily receive the pressing reaction force, and a weight of the lid body can be reduced.

Fifth Aspect

According to the first to the fourth aspects of the present disclosure, the accommodation space may include a battery space occupied by the accommodated battery pack and a remaining space, and the straddle-type vehicle may further include a partition wall that partitions the remaining space into a retainer space in which the retainer is accommodated and another remaining space.

According to the above aspect, when an accommodation object is accommodated in the remaining space in the battery case, the partition wall can prevent the accommodation object from coming into contact with the retainer.

Sixth Aspect

According to the first to the fifth aspects of the present disclosure, the pressing mechanism may include: a compression spring, a first spring seat fixed to the abutting member and configured to support a first end portion of the compression spring, and a second spring seat connected to the abutting member to be movable relative to the abutting member and configured to support a second end portion of the compression spring, and the retainer is capable of holding the second spring seat in a state where the second spring seat is displaced with respect to the first spring seat such that the abutting member is biased toward the battery pack by the compression spring.

Seventh Aspect

According to the first to the sixth aspects of the present disclosure, the pressing mechanism may include a locked portion fixed to the battery case and a locking portion connected to the abutting member and capable of being locked to the locked portion in a state where the abutting member abuts the battery pack.

According to the above aspect, both locking the abutting member abutting against the battery pack to the battery case and pressing the battery pack downward can be implemented by one mechanism.

Eighth Aspect

According to the seventh aspect of the present disclosure, the pressing mechanism may include an operating member that has the locking portion and is operated to lock the locking portion to the locked portion. A first spring seat and a second spring seat each may have an annular shape. The operating member may further include: a pressing portion configured to press the second spring seat toward the compression spring, and a connecting portion that is inserted radially inside the second spring seat, the compression spring, and the first spring seat and connects the pressing portion and the locking portion.

According to the above aspect, both the operation of locking the abutting member to the battery case and the operation of pressing the battery pack downward can be performed by the operating member.

Ninth Aspect

According to the eighth aspect of the present disclosure, the operating member may include: a cam shaft disposed on a side opposite to the compression spring with respect to the second spring seat, and a cam lever that abuts the second spring seat and changes a position of the second spring seat with respect to the first spring seat by rotating around the cam shaft.

According to the above aspect, a user can generate a biasing force for biasing the abutting member downward by an intuitive and easy-to-understand operation of tilting or lifting the cam lever.

Tenth Aspect

According to the eighth aspect of the present disclosure, the locked portion may include a hollow cylindrical cam having an engaging hole and fixed to the battery case. The locking portion may be an engaging pin engageable with the engaging hole. The engaging hole may have a spiral shape that guides the engaging pin downward when the operating member rotates about a rotating shaft extending in a biasing direction of the compression spring. A lower end portion of the engaging hole may have a shape for holding the engaging pin.

According to the above aspect, it is possible to generate the biasing force for biasing the abutting member downward and to lock the abutting member to the battery case by rotating the operating member.

Eleventh Aspect

According to the first or the second aspect of the present disclosure, the pressing mechanism may be disposed on a first side in a direction perpendicular to a direction in which the battery pack is pressed. The battery case may include an engaging portion that engages with the abutting member on a second side opposite to the first side in the direction perpendicular to the direction in which the battery pack is pressed, with the battery pack arranged between the first side and the second side.

According to the above aspect, compared to the case in which the pressing mechanisms are provided on both sides of the battery pack, the number of pressing mechanisms can be reduced.

Twelfth Aspect

A straddle-type vehicle includes: a battery pack configured to store electric power; a battery support that supports the battery pack from below; and a pressing mechanism including an abutting member capable of abutting the battery pack in a state where the battery pack is supported by the battery support, and configured to press the abutting member abutting the battery pack toward the battery pack. The pressing mechanism includes: a locking portion that is displaceable between a locking position where the abutting member is locked to the battery support and an unlocking position where the locking is released, a pressing portion that is displaceable between a pressing position where the abutting member is pressed against the battery pack and a pressing-released position where the pressing is released, and an operator configured to displace the locking portion and the pressing portion.

According to the above aspect, the displacement of the locking portion and the pressing portion can be implemented by a single operator, and it is possible to improve the operability as compared with a case in which the locking operation and the pressing operation are performed with a plurality of operators different from each other.

The straddle-type vehicle may have the following features.

The abutting member may be a lid body that covers the battery pack supported by the battery support from above. According to the above configuration, it is possible to protect an upper end portion of the battery pack while pressing the battery pack downward with the lid body.

The battery support may support the at least one battery pack from below such that upper surfaces thereof are aligned with each other, and the lid body may abut the upper surfaces of the at least one battery pack. According to the above configuration, the biasing force of one compression spring can be applied to the plurality of battery packs via the lid body.

What is claimed is:

1. A straddle-type vehicle comprising:
   a battery case having an accommodation space that accommodates a battery pack and an opening for attaching and detaching the battery pack via the opening that opens the accommodation space;
   a pressing mechanism including an inner lid capable of abutting the battery pack in a state where the battery pack is accommodated in the accommodation space of the battery case, and a retainer that holds the inner lid abutting the battery pack while pressing the inner lid toward the battery pack; and
   an outer lid connected to the battery case while bypassing the pressing mechanism and that opens and closes the opening of the battery case.

2. The straddle-type vehicle according to claim 1, wherein the pressing mechanism is disposed inside the accommodation space.

3. The straddle-type vehicle according to claim 1, wherein the inner lid is detachable from the battery case.

4. The straddle-type vehicle according to claim 1, wherein a thickness direction dimension of the outer lid is smaller than a thickness direction dimension of the inner lid.

5. The straddle-type vehicle according to claim 1, wherein the accommodation space includes a battery space occupied by the accommodated battery pack and a remaining space, and
   the straddle-type vehicle further comprises a partition wall that partitions the remaining space into a retainer space in which the retainer is accommodated and another remaining space.

6. The straddle-type vehicle according to claim 1, wherein the pressing mechanism includes:

a compression spring, a first spring seat fixed to the inner lid and configured to support a first end portion of the compression spring, and a second spring seat connected to the inner lid to be movable relative to the inner lid and configured to support a second end portion of the compression spring, and the retainer is capable of holding the second spring seat in a state where the second spring seat is displaced with respect to the first spring seat such that the inner lid is biased toward the battery pack by the compression spring.

7. The straddle-type vehicle according to claim 1, wherein the pressing mechanism includes a locked portion fixed to the battery case and a locking portion connected to the inner lid and capable of being locked to the locked portion in a state where the inner lid abuts the battery pack.

8. The straddle-type vehicle according to claim 7, wherein the pressing mechanism includes an operating member that has the locking portion and is operated to lock the locking portion to the locked portion, a first spring seat and a second spring seat each have an annular shape, and the operating member further includes:

a pressing portion configured to press the second spring seat toward a compression spring, and a connecting portion that is inserted radially inside the second spring seat, the compression spring, and the first spring seat and connects the pressing portion and the locking portion.

9. The straddle-type vehicle according to claim 8, wherein the operating member includes:

a cam shaft disposed on a side opposite to the compression spring with respect to the second spring seat, and a cam lever that abuts the second spring seat and changes a position of the second spring seat with respect to the first spring seat by rotating around the cam shaft.

10. The straddle-type vehicle according to claim 8, wherein the locked portion includes a hollow cylindrical cam having an engaging hole and fixed to the battery case, the locking portion is an engaging pin engageable with the engaging hole, the engaging hole has a spiral shape that guides the engaging pin downward when the operating member rotates about a rotating shaft extending in a biasing direction of the compression spring, and a lower end portion of the engaging hole has a shape for holding the engaging pin.

11. The straddle-type vehicle according to claim 1, wherein the accommodation space includes a battery space occupied by the accommodated battery pack and a remaining space formed between the inner lid and the outer lid to house a component other than the battery pack.

12. A straddle-type vehicle comprising:

a battery pack configured to store electric power;

a battery support that supports the battery pack from below; and a pressing mechanism including an abutting member capable of abutting the battery pack in a state where the battery pack is supported by the battery support, and configured to press the abutting member abutting the battery pack toward the battery pack, wherein the pressing mechanism includes:

a rod-shaped portion, a locking portion that is rotatable about an axis of the rod-shaped portion and protrudes from one end of the rod-shaped portion in a direction perpendicular to the axis, and that is displaceable between a locking position where the abutting member is locked to the battery support and an unlocking position where the locking is released, a pressing portion that is displaceable between a pressing position where the abutting member is pressed against the battery pack and a pressing-released position where the pressing is released, and an operator configured to displace the locking portion and the pressing portion.

13. The straddle-type vehicle according to claim 12, wherein the pressing mechanism includes:

a compression spring, a first spring seat fixed to the abutting member and configured to support a first end portion of the compression spring, and a second spring seat connected to the abutting member to be movable relative to the abutting member and configured to support a second end portion of the compression spring, and the abutting member is biased toward the battery pack by the compression spring in a state where the pressing portion is displaced to the pressing position and the second spring seat is displaced with respect to the first spring seat.

14. The straddle-type vehicle according to claim 12, wherein the pressing mechanism is disposed on a first side in a direction perpendicular to a direction in which the battery pack is pressed, and a battery case includes an engaging portion that engages with the abutting member on a second side opposite to the first side in the direction perpendicular to the direction in which the battery pack is pressed, with the battery pack arranged between the first side and the second side.

15. A straddle-type vehicle comprising:

a battery case having an accommodation space that accommodates a battery pack and an opening for attaching and detaching the battery pack via the opening that opens the accommodation space;

a pressing mechanism including an abutting member capable of abutting the battery pack in a state where the battery pack is accommodated in the accommodation space of the battery case, and a retainer that holds the abutting member abutting the battery pack while pressing the abutting member toward the battery pack; and a lid body connected to the battery case while bypassing the pressing mechanism and that opens and closes the opening of the battery case, wherein the pressing mechanism is disposed on a first side in a direction perpendicular to a direction in which the battery pack is pressed, and the battery case includes an engaging portion that engages with the abutting member on a second side opposite to the first side in the direction perpendicular to the direction in which the battery pack is pressed, with the battery pack arranged between the first side and the second side.

\* \* \* \* \*